US012127133B1

(12) United States Patent
Haghighat et al.

(10) Patent No.: US 12,127,133 B1
(45) Date of Patent: Oct. 22, 2024

(54) METHODS FOR PERFORMING POWER CONTROL IN NEW RADIO (NR) SYSTEMS

(71) Applicant: INTERDIGITAL PATENT HOLDINGS, INC., Wilmington, DE (US)

(72) Inventors: Afshin Haghighat, Ile-Bizard (CA); Janet Stern-Berkowitz, Little Neck, NY (US); Loic Canonne-Velasquez, Dorval (CA); Moon-il Lee, Melville, NY (US); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/752,403

(22) Filed: Jun. 24, 2024

Related U.S. Application Data

(63) Continuation of application No. 18/441,553, filed on Feb. 14, 2024, which is a continuation of application
(Continued)

(51) Int. Cl.
*H04W 52/10* (2009.01)
*H04W 52/14* (2009.01)
(Continued)

(52) U.S. Cl.
CPC ....... *H04W 52/146* (2013.01); *H04W 52/242* (2013.01); *H04W 52/262* (2013.01);
(Continued)

(58) Field of Classification Search
CPC ..... H04W 52/10; H04W 52/08; H04W 72/04; H04W 72/0453; H04W 72/044; H04W 72/232; H04W 48/12; H04W 40/16
See application file for complete search history.

(56) References Cited

U.S. PATENT DOCUMENTS 7,400,861 B2  7/2008 Terry
8,583,160 B2 11/2013 Gaal et al.
(Continued)

FOREIGN PATENT DOCUMENTS

| CN | 103945504 | 7/2014 |
| WO | 2011/100673 | 8/2011 |
| WO | WO-2017035464 A1 * | 3/2017 .......... H04W 52/146 |

OTHER PUBLICATIONS

Ericsson, "On power control for NR," 3GPP TSG-RAN WG1 #88, R1-1702695, Athens, Greece (Feb. 13-17, 2017).
(Continued)

*Primary Examiner* — Tu X Nguyen
(74) *Attorney, Agent, or Firm* — VOLPE KOENIG

(57) ABSTRACT

The disclosed method and an apparatus are directed to determine an uplink transmission power in in New Radio (NR) systems by a wireless transmit/receive unit (WTRU) for transmitting at least one physical uplink shared channel (PUSCH), using multiple beams toward multiple Tx/Rx points (TRPs). The method includes determining common parameters like a target receive power, a modulation and coding scheme (MCS) specific offset, and a transmit power control (TPC) command parameters common to the multiple beams. The method also includes determining beam-specific parameters like path loss for each beam, a configurable fractional power compensation factor for each beam, and a configurable maximum transmit power level of the each beam, wherein the fractional power compensation factor and the configurable maximum transmit power level for the each beam are determined dynamically or semi-statically based on at least deployment, WTRU mobility, or interference level.

10 Claims, 14 Drawing Sheets

Related U.S. Application Data

No. 18/114,770, filed on Feb. 27, 2023, now Pat. No. 11,937,187, which is a continuation of application No. 16/496,300, filed as application No. PCT/US2018/023852 on Mar. 22, 2018, now Pat. No. 11,595,905.

(60) Provisional application No. 62/474,928, filed on Mar. 22, 2017, provisional application No. 62/500,760, filed on May 3, 2017, provisional application No. 62/519,746, filed on Jun. 14, 2017, provisional application No. 62/547,308, filed on Aug. 18, 2017, provisional application No. 62/556,140, filed on Sep. 8, 2017, provisional application No. 62/568,861, filed on Oct. 6, 2017, provisional application No. 62/590,947, filed on Nov. 27, 2017.

(51) Int. Cl.
*H04W 52/24* (2009.01)
*H04W 52/26* (2009.01)
*H04W 52/28* (2009.01)
*H04W 52/36* (2009.01)
*H04W 52/42* (2009.01)

(52) U.S. Cl.
CPC ....... *H04W 52/285* (2013.01); *H04W 52/367* (2013.01); *H04W 52/42* (2013.01)

(56) References Cited

U.S. PATENT DOCUMENTS

| | | |
|---|---|---|
| 9,980,291 B2 | 5/2018 | Jeong et al. |
| 10,028,275 B2 | 7/2018 | Lyu |
| 10,070,397 B2 | 9/2018 | Shin et al. |
| 10,111,255 B2 | 10/2018 | Islam et al. |
| 10,136,440 B2 | 11/2018 | Rong et al. |
| 10,211,904 B2 | 2/2019 | Hessler et al. |
| 10,736,044 B2 | 8/2020 | Ryu et al. |
| 2013/0102345 A1 | 4/2013 | Jung |
| 2014/0185481 A1 | 7/2014 | Seol et al. |
| 2014/0315594 A1 | 10/2014 | Jeong et al. |
| 2016/0227485 A1 | 8/2016 | Davydov et al. |
| 2018/0324708 A1 | 11/2018 | Cheng |
| 2018/0324715 A1 | 11/2018 | Ryoo et al. |
| 2019/0223117 A1 | 7/2019 | Chai et al. |

OTHER PUBLICATIONS

Huawei et al., "Detailed considerations on UL power control design for NR," 3GPP TSG RAN WG1 Meeting #88, R1-1701688, Athens, Greece (Feb. 13-17, 2017).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
Interdigital Communications, "On Power Control Processes for Multi Beam Transmission in NR," 3GPP TSG RAN WG1 Meeting #88bis, R1-1705515, Spokane, USA (Apr. 3-7, 2017).
Interdigital Inc., "Common and Beam Specific Power Control Parameters," 3GPP TSG RAN WG1 Meeting #90, R1-1714170, Prague, Czech Republic (Aug. 21-25, 2017).
Interdigital Inc., "Common and Beam Specific Power Control Parameters," 3GPP TSG RAN WG1 NR Ad-Hoc#2, R1-1710962, Qingdao, P.R. China (Jun. 27-30, 2017).
Interdigital Inc., "On Efficient UL Beam Management," 3GPP TSG RAN WG1 Meeting #90, R1-1714143, Prague, Czech Republic (Aug. 21-25, 2017).
Interdigital Inc., "On Power Control Processes for Multi Beam Transmission in NR," 3GPP TSG RAN WG1 Meeting #89, R1-1708361, Hangzhou, China (May 15-19, 2017).
Interdigital Inc., "Power Sharing Mechanisms with LTE-NR DC and NR," 3GPP TSG RAN WG1 Meeting #90, R1-1714118, Prague, Czech Republic (Aug. 21-25, 2017).
Interdigital Inc., "Power Sharing Mechanisms with LTE-NR DC and NR DC," 3GPP TSG RAN WG1 NR Ad-Hoc#2, R1-1710879, Qingdao, P.R. China (Jun. 27-30, 2017).
Nokia et al., "Power Control for MIMO," 3GPP TSG-RAN WG1 Meeting #87, R1-1612876, Reno, USA (Nov. 14-18, 2016).
Nokia et al., "UL Power Control for MIMO," 3GPP TSG RAN WG1 Meeting #88, R1-1703185, Athens, Greece (Feb. 13-17, 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.1.0 (Dec. 2016).
Third Generation Partnership Project, "Technical Specification Group Radio Access Network; Evolved Universal Terrestrial Radio Access (E-UTRA); Physical layer procedures (Release 14)," 3GPP TS 36.213 V14.5.0 (Dec. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.0.0 (Dec. 2017).
Third Generation Partnership Project, "Technical Specification Group Radio Access Network; NR; Physical layer procedures for control (Release 15)," 3GPP TS 38.213 V15.0.0 (Dec. 2017).
Third Generation Partnership Project, "Technical Specification Group Radio Access Network; Evolved Universal Terrestrial Radio Access (E-UTRA); Services provided by the physical layer (Release 14)," 3GPP TS 36.302 V14.1.0 (Dec. 2016).
Third Generation Partnership Project, "Technical Specification Group Radio Access Network; Evolved Universal Terrestrial Radio Access (E-UTRA); Services provided by the physical layer (Release 14)," 3GPP TS 36.302 V14.4.0 (Dec. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.1.0 (Dec. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.5.0 (Dec. 2017).
Third Generation Partnership Project, "Technical Specification Group Radio Access Network; Evolved Universal Terrestrial Radio Access (E-UTRA) and Evolved Universal Terrestrial Radio Access Net-

(56) References Cited

OTHER PUBLICATIONS work (E-UTRAN); Overall description; Stage 2 (Release 15)," 3GPP TS 36.300 V15.0.0 (Dec. 2017).

Third Generation Partnership Project, "Technical Specification Group Radio Access Network; Evolved Universal Terrestrial Radio Access (E-UTRA);Medium Access Control (MAC) protocol specification (Release 14)," 3GPP TS 36.321 V14.2.0 (Mar. 2017).

Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.5.0 (Dec. 2017).

Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.0.0 (Dec. 2017).

Third Generation Partnership Project, "Technical Specification Group Radio Access Network; NR; Physical layer procedures for data (Release 15)," 3GPP TS 38.214 V15.0.0 (Dec. 2017).

Third Generation Partnership Project, "Technical Specification Group Radio Access Network; NR; NR and NG-RAN Overall Description; Stage 2 (Release 15)," 3GPP TS 38.300 V15.0.0 (Dec. 2017).

Third Generation Partnership Project, "Technical Specification Group Radio Access Network; NR; Medium Access Control (MAC) protocol specification (Release 15)," 3GPP TS 38.321 V15.0.0 (Dec. 2017).

* cited by examiner

METHODS FOR PERFORMING POWER CONTROL IN NEW RADIO (NR) SYSTEMS

CROSS REFERENCE TO RELATED APPLICATIONS

This application is a continuation of U.S. patent application Ser. No. 18/441,553 filed Feb. 14, 2024, which is a continuation of U.S. patent application Ser. No. 18/114,770 filed Feb. 27, 2023, which issued on Mar. 19, 2024 as U.S. Pat. No. 11,937,187, which is a continuation of U.S. patent application Ser. No. 16/496,300 filed Sep. 20, 2019, which issued on Feb. 28, 2023 as U.S. Pat. No. 11,595,905, which is a U.S. National Stage, under 35 U.S.C. § 371, of International Application No. PCT/US2018/023852 filed Mar. 22, 2018, which claims the benefit of U.S. provisional applications 62/474,928 filed Mar. 22, 2017; 62/500,760 filed May 3, 2017; 62/519,746 filed Jun. 14, 2017; 62/547,308 filed Aug. 18, 2017; 62/556,140 filed Sep. 8, 2017; 62/568,861 filed Oct. 6, 2017; and 62/590,947 filed Nov. 27, 2017, the contents of which are hereby incorporated by reference herein.

BACKGROUND

There are two objectives of an uplink power control mechanism. First, the power control mechanism adjusts wireless transmit/receive unit (WTRU) transmit power to counter path loss and channel fades to maintain the expected target performance. Secondly, the power control mechanism also attempts to control and minimize the level of inter-cell interference.

There are several new aspects of New Radio (NR) systems that influence the operation of the uplink power control. Accordingly, uplink power control mechanisms for NR systems are needed.

SUMMARY

Methods and an apparatus for performing power control in New Radio (NR) systems are disclosed. A method includes transmitting an uplink signal using multiple beams by a wireless transmit/receive unit (WTRU). The method includes determining common parameters which are common to the multiple beams and beam-specific parameters which are determined for each beam. The common parameters may comprise a target receive power, a modulation and coding scheme (MCS) specific offset, or a transmit power control (TPC) command. The beam-specific parameters may comprise estimated path loss, a configurable fractional power compensation factor or a configurable maximum transmit power level, dynamically or semi-statically, based on deployment, WTRU mobility, or interference level. The method further includes transmitting codewords to multiple Tx/Rx points (TRPs) using the multiple beams each having a transmit power calculated based on the common parameters and the beam-specific parameters.

Another method is directed to transmit a first uplink data signal using a first beam having a first transmission power, a first reference signal using a second beam having a second transmission power, a second uplink data signal using a third beam having a third transmission power, and a second reference signal having a fourth beam having a fourth transmission power. The method includes transmitting the first uplink and the first reference signals during first time intervals, and the second uplink and the second reference signals during second time intervals. According to the method, the second transmission power and the fourth transmission power are constant during the first and the second time intervals, respectively. According to the method, the third transmission power is increased by an amount of offset after receiving a transmit power control (TPC) command at an instance within the second time intervals and the first transmission power is decreased by the same amount of offset at the same instance within the first time intervals.

BRIEF DESCRIPTION OF THE DRAWINGS

A more detailed understanding may be had from the following description, given by way of example in conjunction with the accompanying drawings wherein.

DETAILED DESCRIPTION

Figure 1A:
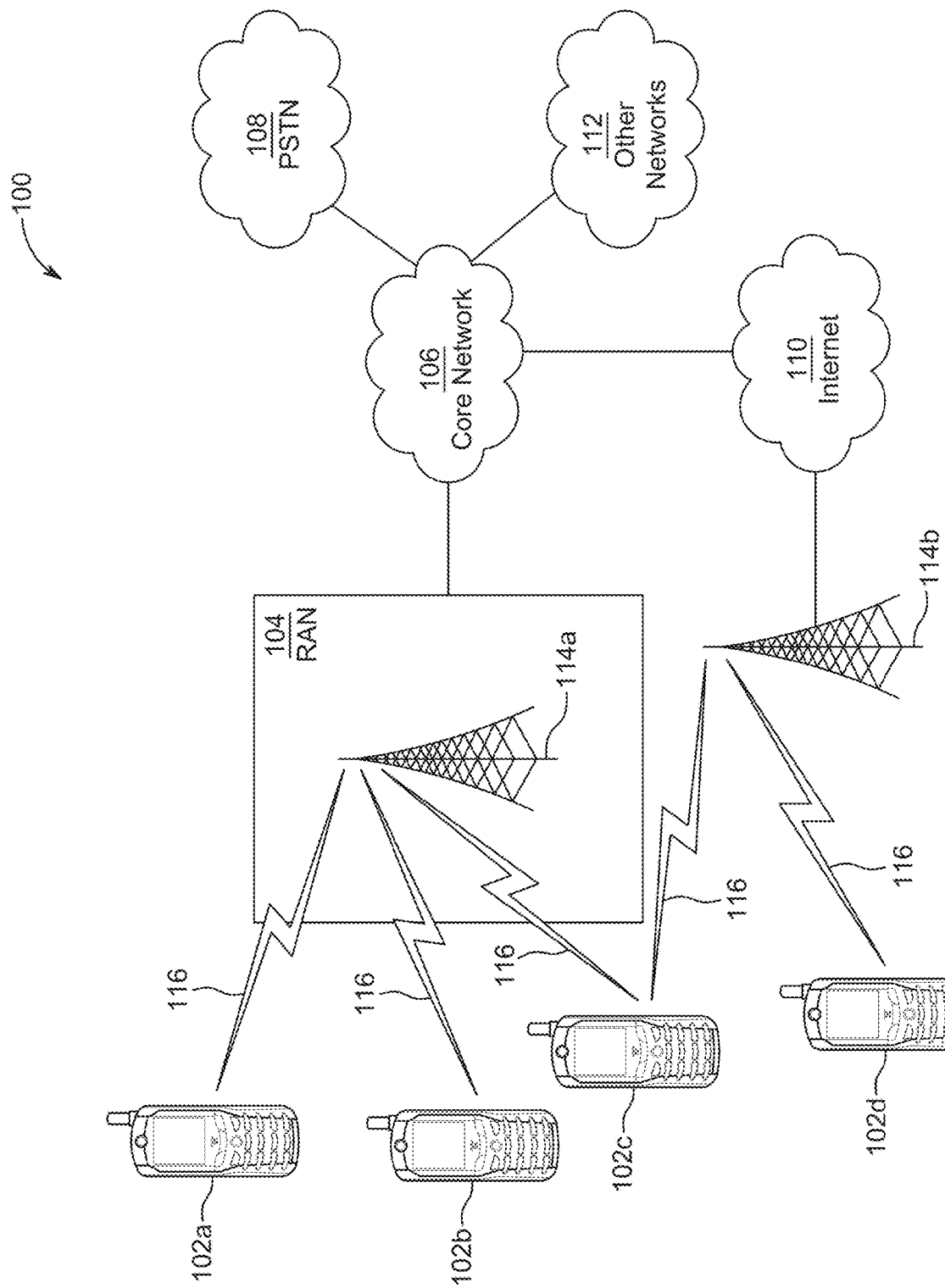
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. Byway of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, the base station 114a may include three transceivers, i.e., one for each sector of the cell. The base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
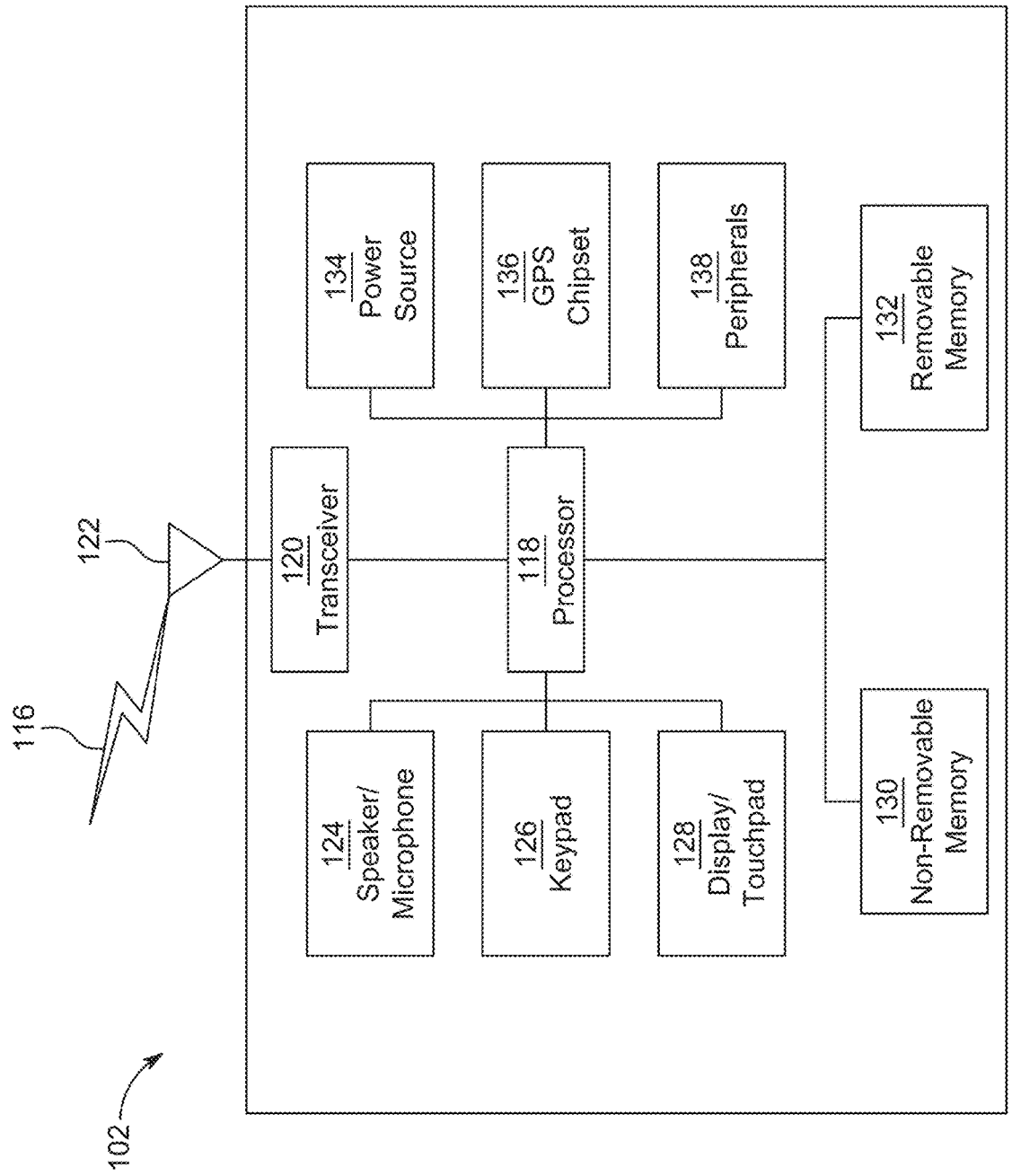
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WT RU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
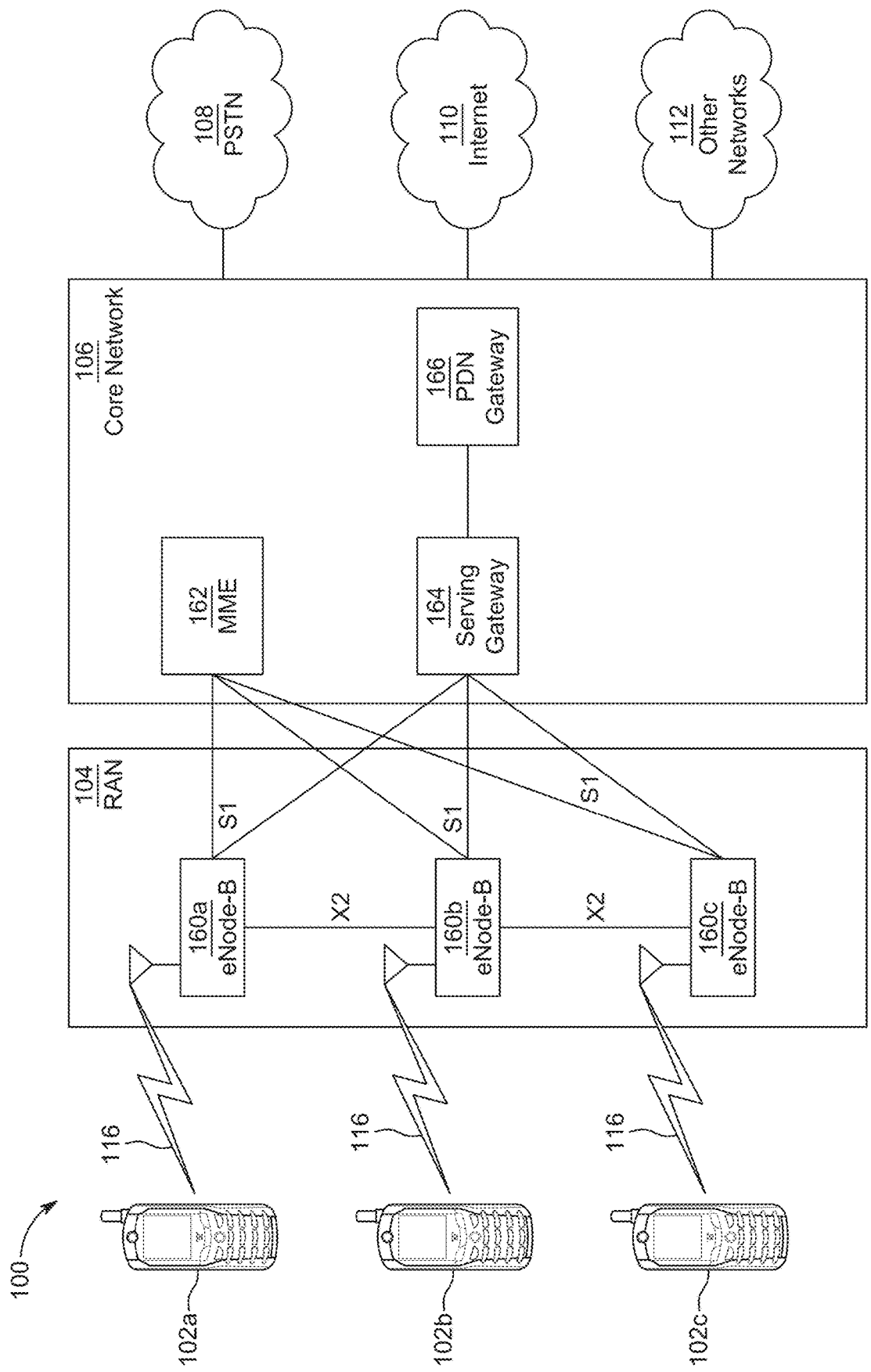
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via a S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
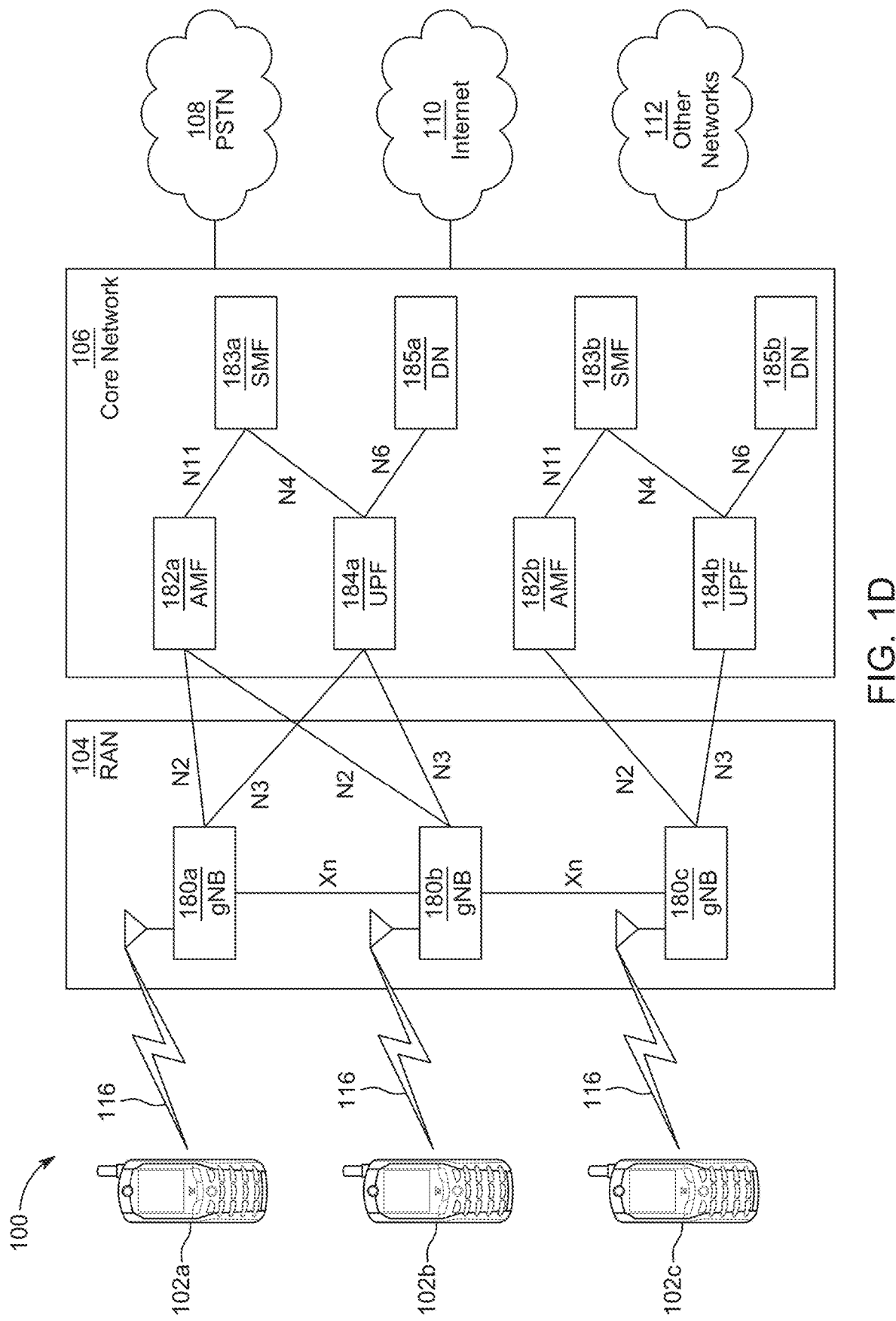
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via a N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

There are a number of different issues related to performing power control in NR systems. The multi beam transmission feature of NR requires a different approach to the handling and scaling of power among the uplink beams.

The power scaling process of NR systems also needs to accommodate reliable operation of critical versus non-critical transmissions (i.e., URLLC vs. eMBB services). Further, path loss (PL) estimation is another challenging issue in NR due to existence of beam-based transmission and the related pairing process.

NR power control should also support operation of grant free and INACTIVE mode PUSCH transmission where there is not much path loss information available for the determination of uplink transmit power. NR power control considers two waveforms (CP-OFDM and DFT-s-OFDM) for uplink transmissions. Due to different signal envelope characteristics of these waveforms, power control should be adjusted according to the adopted waveform for transmission.

An uplink NR transmission may comprise a number of symbols with different numerologies and the impact of mixed numerology should also be considered for uplink power determination. The power control mechanism for LTE PUSCH provides a baseline for the power control mechanism for NR described herein, which is described on the basic model for PUSCH power control and extended to other channels and physical signal where appropriate.

In a LTE framework, the expected PUSCH power intended for cell c on the $i_{th}$ subframe may be described as:

$$P_{PUSCH,c}(i) = \min\begin{Bmatrix} P_{CMAX,c}(i), \\ 10\log_{10}(M_{PUSCH,c}(i)) + \\ P_{O\_PUSCH,c}(j) + \alpha_c(j) \cdot PL_c + \\ \Delta_{TF,c}(i) + f_c(i) \end{Bmatrix} [dBm]$$

where, $P_{CMAX,c}(i)$: WTRU's maximum transmit power in dBm
$M_{PUSCH,c}(i)$: # of RBs allocated on the PUSCH
$P_{O\_PUSCH,c}(j)$: target received power (from system information block 2 (SIB2))
$\alpha_c(j)$: fractional power compensation factor [0:1] (from SIB2)
$PL_c$: path loss (estimated from measurement on common reference signal (CRS) and fixed transmission power information from SIB2)
$\Delta_{TF,c}(i)$: MCS specific offset
$f_c(i)$: TPC command—short term adjustments (closed loop sent on downlink control information (DCI) format 3/3a) and j is a parameter index configured by the higher layer.

Other channels, such as PRACH, SRS, PUCCH, PUSCH, may be described in a similar manner. Power control for k-beam PUSCH transmissions is discussed herein. An example for separation of beam common and beam specific parameters disclosed below are applicable to other channels as well, (e.g., PUCCH, SRS).

Figure 2:
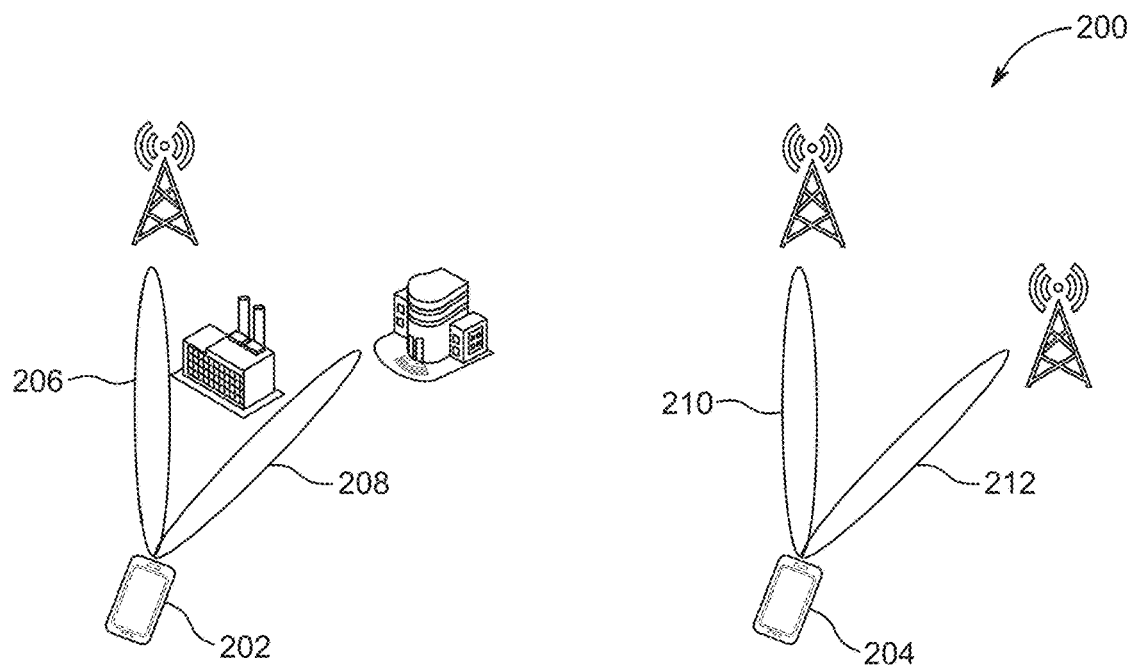
FIG. 2 shows examples of simultaneous multi beam transmission.

FIG. 2 shows examples 200 of simultaneous multi beam transmission. A WTRU 202 may transmit single codewords with redundant or diversity beams. Or the WTRU 204 may transmit multiple codewords 210, 212 to multiple Tx/Rx points (TRPs).

As shown in FIG. 2, a WTRU may support a multitude of simultaneous beams 206, 208, 210, 212 for its UL transmission. The simultaneous beams may be at the same frequency, or at different intra-band or inter-band frequencies. The generated beams 210, 212 may serve as the main conduits of UL transmissions to carry data, control or a combination thereof. The transmissions may be directed to the same Tx/Rx point (TRP) or multiple TRPs 210, 212. In another example, the generated beams 206, 208 may be proposed as a redundant set of beams to counter blockage, and other transmission anomalies.

The power control parameters required for maintenance of power control processes related to transmission of K beams may be grouped under two main groups of common specific set of parameters like the number of resource blocks, target received power, Modulation and Coding Scheme (MCS), and Transmit Power Control (TPC), and beam specific set of parameters like Path Loss (PL), PL compensation factor, and maximum power. The definitions of common and beam specific parameters may or may not be the same across different physical uplink channels.

For transmission of a single PUSCH codeword by employing K beams, a WTRU may determine the uplink transmit power by the following procedure: estimating path loss for each beam of a multiple beams; determining a configurable fractional power compensation factor per each beam independently; and determining or setting a configurable maximum transmit power level of the each beam. The configurable values for fractional compensation factors and maximum transmit power per beam may be determined dynamically or semi-statically, based on at least one of the factors like deployment, WTRU mobility and interference level.

Each beam may experience a different path loss $PL_{(k)c}$, thus have a fractional power compensation factor $\alpha_{(k)c}(j)$ and a maximum transmit power $P_{CMAX(k),c}(i)$, which are not correlated with those of other beams. However, other parameters of the beams may be same. The power for each beam may be determined based on a set of independently configurable parameters:

$$P_{PUSCH(k),c}(i) = \min\begin{Bmatrix} P_{CMAX(k),c}(i), \\ 10\log_{10}(M_{PUSCH,c}(i)) + P_{O\_PUSCH,c}(j) + \\ \alpha_{(k)c}(j) \cdot PL_{(k)c} + \Delta_{TF,c}(i) + f_c(i) \end{Bmatrix}$$

where k represents the index related to the $k_{th}$ beam; $M_{pusch,c(i)}$ is the number of resource blocks; $P_{o\_pusch,c(j)}$ is a target received power; $\alpha_c$ (j) is the fractional power compensation factor; $PL_{(k)c}$ is the path loss, $\Delta_{TF,c}(i)$ is a Modulation-Coding Scheme (MCS) specific offset; and fc(i) is a Transmit Power Control (TPC) command.

In the case of non-accumulative operation, the $f_c(i)$ may be scaled according to the number of beams. The total transmitted power may be represented as $$P_{PUSCH,c}(i) = \min\begin{Bmatrix} P_{CMAX,c}(i), \\ \sum_k P_{PUSCH(k),c}(i) \end{Bmatrix}.$$

In another instance, a WTRU may determine uplink transmission power levels for transmitting M number of multiple codewords using multiple beams to multiple Tx/Rx points (TRPs). The WTRU may follow the below procedure. First, the WTRU may measure estimation of path loss of each beam of the multiple beams. Then, the WTRU may determine a configurable fractional power compensation factor per each beam independently. The WTRU may set a configurable maximum transmit power level of the each beam and applies at least one M codeword-specific parameter like a MCS offset, a number of radio bearer (RB)'s scale factors, or a Transmit Power Control (TPC) command.

The configurable values for fractional compensation factors and maximum power per beam may be determined dynamically or semi-statically based on at least one of the factors like deployment, WTRU mobility, and an interference level. This procedure may involve transmission of M independent codewords, where each codeword, represented by index m, may be transmitted by a subset of K' beams. Therefore, each beam used for transmission of the $m_{th}$ codeword may experience a different path loss $PL_{(m,k')c}$, fractional power compensation factor $\alpha_{(m,k')c}(j)$ and max transmit power $P_{CMAX(m,k')c}(i)$ where k' represents the index related to the $k'_{th}$ beam. Furthermore, due to independence of M codewords, the other set of parameters may need to be adjusted per codeword. Therefore, the PUSCH power per beam per codeword may be determined according to:

$$P_{PUSCH(m,k'),c}(i) = \min\begin{Bmatrix} P_{CMAX(m,k'),c}(i), \\ 10\log_{10}(M_{PUSCH(m),c}(i)) + \\ P_{O\_PUSCH(m),c}(j) + \\ \alpha_{(m,k'),c}(j) \cdot PL_{(m,k'),c} + \\ \Delta_{TF(m),c}(i) + f_{(m),c}(i) \end{Bmatrix}$$

If each codeword is mapped on the same frequency, similar to the case of single codeword transmission, the total transmitted power may be determined as:

$$P_{PUSCH,c}(i) = \min\left\{ \begin{array}{l} P_{CMAX,c}(i), \\ \sum_{m,k'} P_{PUSCH(m,k'),c}(i) \end{array} \right\}.$$

where each codeword is mapped on a different frequency, the total PUSCH transmitted power may be determined as:

$$P_{PUSCH,c}(i) = \min\left\{ \begin{array}{l} \sum_m P_{CMAX(m),c}(i), \\ \sum_{m,k'} P_{PUSCH(m,k'),c}(i) \end{array} \right\}$$

where $P_{CMAX(m),c}(i)$ is the WTRU's maximum transmit power per frequency component.

TPC parameters may be classified into common TPC parameters or loop specific TPC parameters. Each TPC loop derives its parameters from the two TPC parameter classes that may be mapped to one or more of the following transmission entities: one or more beams; one or more beam-pair links; one or more transmission layers; one or more panels; and one or more TRP. The common TPC parameters define a set of parameters used by a group of TPC loops.

First, the common TPC parameters may define a set of parameters common to all the TPC loops used by sub-transmission entities (e.g., beams, beam-pair links, transmission layers or panels) that are associated with one or more TRPs.

Second, multiple common parameters may be defined, with each common TPC parameter assigned to a set of TPC loops. This enables grouping of the TPC loops based on transmission entity type (e.g., beam type, beam-pair link (BPL) group, panel, TRP). The grouping may also be dependent on the transmission scheme used. For example, in the case of a transmit diversity scheme (e.g., precoder cycling), the parameter $M_{PUSCH,c}(i)$ (i.e., the number of RBs allocated on the PUSCH for the transmission) may be the same for the multiple beam-pair links used (and as such the multiple TPC loops used on each BPL) and as such may be signaled in the set of common TPC parameters. Alternatively, in the case of independent BPL transmission, the parameter $M_{PUSCH,c}(i)$ may be different.

The TPC loop specific TPC parameters define a set of parameters that are specific to an individual TPC loop. The loop specific parameters may be defined in a manner that is independent of the common parameters (i.e., from a non-overlapping set of parameters), or dependent on the common parameter (i.e., an overlapping set of parameters, e.g., a differential value from the common parameter), which seeks to lower the overhead that may be required by having independent parameters for each TPC loop.

Third, the set of common and transmission entity specific parameters may be non-overlapping and non-configurable (i.e., fixed). The LTE framework for the expected PUSCH power intended for cell c on the $i_{th}$ subframe is introduced here again:

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\}[dBm]$$

where, $P_{CMAX,c}(i)$: WTRU's maximum transmit power in dBm
$M_{PUSCH,c}(i)$: # of RBs allocated on the PUSCH
$P_{O\_PUSCH,c}(j)$: target received power (from SIB2)
$\alpha_c(j)$: fractional power compensation factor [0:1] (from SIB2)
$PL_c$: path loss (estimated from measurement on CRS and fixed TX power information from SIB2)
$\Delta_{TF,c}(i)$: MCS specific offset.
$f_c(i)$: TPC command—short term adjustments (closed loop sent on DCI format 3/3a).

The parameters $P_{CMAX,c}(i)$, $P_{O\_PUSCH,c}(j)$ and $\alpha_c(j)$, may be set as common TPC parameters while the parameters, $M_{PUSCH,c}(i)$, $PL_c$, $\Delta_{TF,c}(i)$ and $f_c(i)$ may be set as loop specific TPC parameters.

The common parameters may be signaled in the broadcast channel or in a group common PDCCH. The specific parameters may be signaled per TPC loop within each transmission entity. This value may be signaled in the MAC CE or may be signaled in a L1 control channel in a WTRU specific PDCCH or a transmission entity specific. Note that the use of a WTRU specific PDCCH may be necessary, especially in the beam-specific TPC, as the receive beam for each WTRU (and hence the beam-pair links) may be independent.

Fourth, the same non-overlapping, but configurable common and TPC loop specific parameters are discussed. A set of configurable common and specific parameters allows a system to decide which parameters fall within which TPC parameter class. The decision may depend on the specific transmission entity and the transmission scheme (e.g., transmission to multiple TRPs may require completely independent loops while transmission using a transmit diversity schemes may require some dependency between the loops).

The TPC configuration (i.e., the setup of the TPC parameters as common or loop specific) may occur during initial access or during entity recovery (e.g., beam loss recovery) and may be defined statically (e.g., in the broadcast channel), semi-statically (e.g., in a MAC CE) or dynamically (e.g., in the L1 control channel). The choice may depend on the rapidity of change in the channel.

For example, a single set of common parameters may be defined for a TRP. The parameters may be apriori listed as {p1, p2, . . . , pN}, where Pi is parameter i as defined from an uplink TPC estimation formula with N parameters. The initial access procedure may communicate the parameter type in a channel broadcast in the transmission entity. In one example, the type may be broadcast as a binary transmission stream of bits of size N with [Type 1, . . . , Type N]={1, . . . , 0} corresponding to parameters {p1, . . . , pN}.

The common parameters may be signaled in the broadcast channel or in a group common PDCCH. The specific parameters may be signaled per TPC loop within each transmission entity. This value may be signaled in the MAC CE or may be signaled in an L1 control channel in a WTRU specific PDCCH or a transmission entity specific. Note that the use of a WTRU specific PDCCH may be necessary especially in the beam-specific TPC as the receive beam for each WTRU (and hence the beam-pair links) may be independent.

For example, multiple sets of common parameters may be defined for a TRP. The parameters may be apriori listed as {Gi, p1, p2, . . . , pN}, where pi is parameter i as defined from an uplink TPC estimation formula with N parameters and Gi indicates the TPC loop group. The initial access procedure may communicate the group parameters and associated type in a channel broadcast in the transmission entity. In one example, the information may be broadcast as a binary transmission stream of bits of size N with [Gi, Type 1, . . . , Type N]={1, . . . , 0} corresponding to parameters {p1, . . . , pN} for group i.

In one example, the information may be broadcast by indicating the number of groups and then transmitting the types in a concatenated manner. [Gi=2] [Type 1, . . . , Type N] [Type 1, . . . , Type N]={1, . . . , 0}{0, . . . , 0, 1}. A group may be based on a subset of transmission entities such as layers, a BPP group, TRP or BPL.

In addition to the signaling needed per TPC loop, a procedure to assign a TPC loop to a specific group enables the entity identify the TPC common parameters. This may occur also during the initial access procedure or the setup/recovery of the transmission entity.

Overlapping and Configurable Common and TPC loop specific parameters are discussed herein. In the case of overlapping loop specific parameters, a TPC parameter that has been transmitted in the set of common TPC parameters may be optionally reset in the loop specific case. This essentially over-rides the group/common value. The actual over-ride value may be sent or the change between the actual value and the new value may be sent. The second method may have the advantage of reducing the overhead needed as the differential value may be small.

The set of parameters to be over-ridden may be fixed or configurable, which requires signaling to indicate the specific parameter over-ridden in addition to its value.

Figure 3:
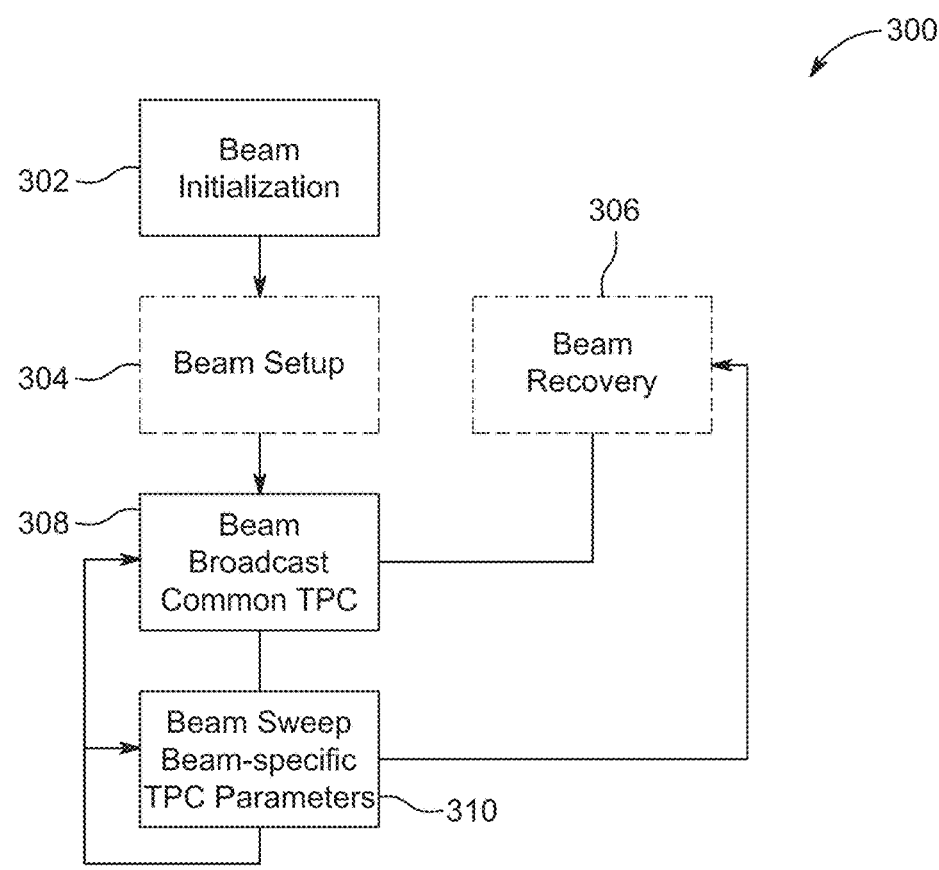
FIG. 3 shows a diagram for performing beam specific TPC with common and beam specific TPC signaling.

Beam specific TPC with common and beam specific TPC parameters are discussed herein. FIG. 3 shows a diagram 300 for performing beam specific TPC with common and beam specific TPC signaling. In beam specific TPC, the single or multiple common TPC parameters may be transmitted 308 after beam setup 304 or initialization 302 or beam recovery 306 in the beam broadcast channel at a desired periodicity. The beam(-pair) specific TPC parameters may then be sent to each WTRU on the downlink PDCCH 310.

In the case of a change in the common parameters that needs to be transmitted to the WTRU in between the periodic sweep of the beam broadcast channel, common TPC information may be transmitted by the group common PDCCH. In LTE, downlink path loss is estimated as the difference between referenceSignalPower and higher layer filtered Reference Signal Received Power (RSRP), where referenceSignalPower is cell-specific and provided by the higher layer signaling, and RSRP is always averaged with L3 filtering.

For beam based transmission, the referenceSignalPower may need to be changed to beam specific. This may be signaled as part of the common TPC parameters, and may be the same for a group of WTRUs that may be referencing the same beam for measurement. For WTRUs with different receive beams, other parameters may be different.

Due to the sweeping of the beams, the signaling and filtering may need to occur at a layer below L3 to account for change in beams (and beam based interference). This may be implemented by using the group common and WTRU specific PDCCH for signaling more information on the common and beam-pair specific TPC. With beam switching, the dynamic nature of the beams due to beam switching may require the WTRU procedure to modify its TPC procedure.

In one example, when changing to a new beam, the WTRU may re-estimate TPC parameters (i.e., restart TPC process). This may require the WTRU to have multiple TPC processes corresponding to multiple TPC loops. For example, the TPC loop for the beams used for PDCCH transmission/reception may be different from the TPC loop for the beams required for data transmission.

In one example, when changing to a new beam, the WTRU may re-adjust its TPC parameters based on a prediction/estimation from prior TPC processes. This may be entirely WTRU autonomous or may be assisted by the eNB with information transmitted in the beam broadcast channel. Information that may be used include the beam gain or beam gain change, the beam boresight, the new transmit power, the new beam index (in case the WTRU may have internal information based on the index used).

Figure 4:
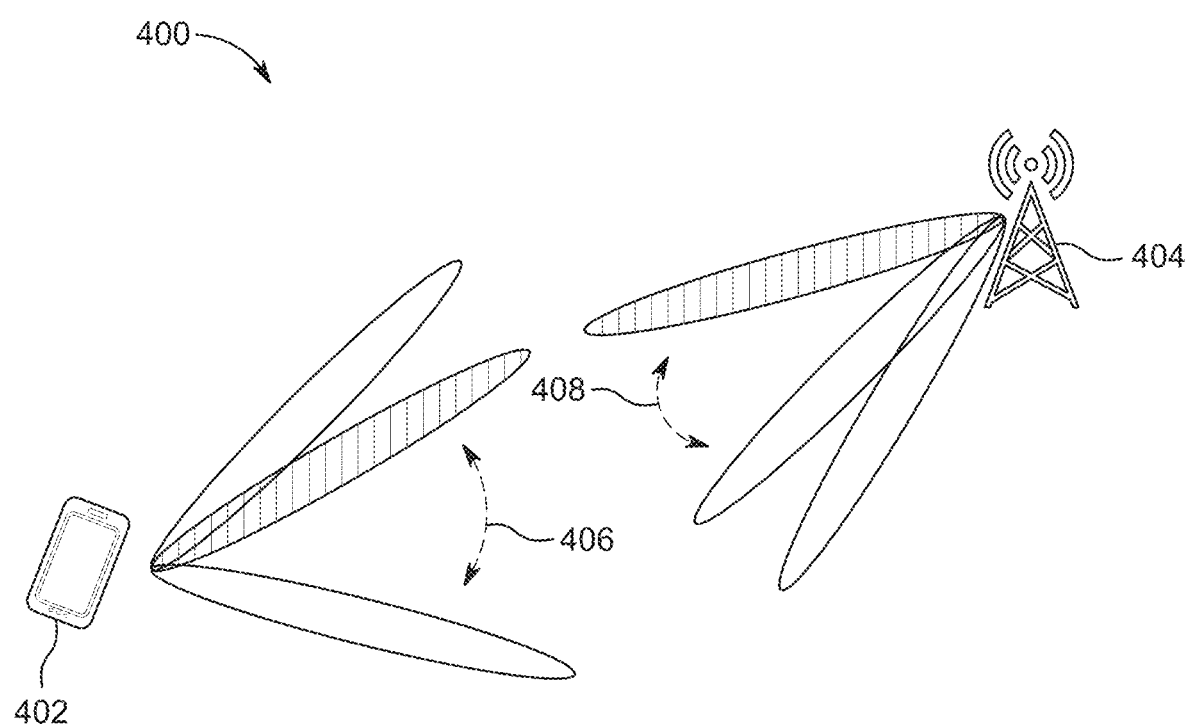
FIG. 4 shows a beam-pair link (BPL) determination.

The WTRU's behavior for BPL switch is discussed herein. FIG. 4 shows a beam-pair link (BPL) determination 400. As shown in FIG. 4, a beam-pairing procedure includes a number of transmission events with different beams 406, 408 at the receive and transmit ends (402, 404) of a wireless system to determine the best BPL. As such, the best beam-pair is identified after completion of several beam trials at each end. A beam-pairing process may be required at the beginning of a transmission; however, it may also be called up at a periodic or non-periodic-basis to re-evaluate the choice of the BPL.

A change in a BPL may not be always entirely based on BPL path loss. In certain scenarios, a change in BPL may be required by excluding certain beams for mitigating imposed interference on neighboring cells or WTRUs. Therefore, in the case of a BPL switch, a WTRU may be required to use a different beam set than what the WTRU has been relying on. Since, the new BPL may exhibit a different path loss, the transmitted power need to be adjusted accordingly.

In an example, a WTRU collects and maintains the measured BPL selection metric for one or more considered BPL combinations. An example of such a selection metric may be the experienced path loss associated to each BPL. Without loss of generality, for easier presentation, path loss may be considered as the measured metric.

In another example, if a WTRU determines implicitly or explicitly that a BPL switch has triggered due to a beam restriction, rather than initiating a new pairing process, it may refer to the stored BPL path loss data from the previous step to determine the second best BPL.

In another example, a WTRU may determine the new transmit power by applying the difference of the original BPL path loss and the one of the newly selected BPL.

$$P_{PUSCH(New),c}(i) = \min \begin{Bmatrix} P_{CMAX,c}(i), \\ P_{PUSCH(Last),c}(i) + \\ \alpha_c(j) \cdot (PL_{(New)c} - PL_{(Last)c}) \end{Bmatrix}$$

In NR deployments, the interference on the uplink may be highly variable and increased compared to legacy deployments due to dynamic BPL switching and the higher likelihood of scheduling multi-user (MU) transmissions on the uplink compared to previous legacy deployments. To reduce inter-cell interference a TRP may restrict the set of BPL that a WTRU may use in order to reduce interference to a neighboring cell, the restriction indication may be triggered by an interference indication received from a neighboring cell or based on the loading of the neighboring cell; such a signal may be an Overload Indicator (OI) or other type.

However, in these types of measurements, a WTRU may still be able to transmit on the same RB with a different beam. The WTRU may set the transmit power with the different beam in order to achieve lower interference with the neighboring cell. In this case, the serving cell needs to know which beams at the WTRU are causing high interference to the neighboring cell.

A WTRU may feedback to its serving cell the indication of its strongest BPL to the neighboring cells in addition to its strongest BPL to the serving cell. The WTRU may feedback the single strongest one or select only those that fall within a preconfigured threshold. The feedback may be performed during initial cell attachment when the WTRU performs several measurements to find the serving cell, triggered by the TRP or periodically fed back. If the WTRU periodically performs measurements on its BPL, the WTRU may also trigger a feedback whenever it determines a new interfering BPL falls within a threshold to its serving cell's strongest BPL.

A beam failure may also trigger a BPL switch if the link quality falls below a threshold. The link quality may be falling too quickly with respect to the rate of power control adjustments; moreover, it may only affect the quality temporarily due to blockage or other dynamic channel conditions such that a full BPL switch may not be necessary.

In an example, to avoid triggering a BPL switch, a WTRU may add a one shot compensation factor $f_b(i)$. Its value may be based on the failure threshold or on other measurements of the link quality. The factor may have a limited time duration and limited usage rate within some predefined duration. It may be triggered by a timer according to a duration during which the quality of the BPL is below the threshold. The transmit power of the WTRU may therefore be determined by the following equation during the period which the compensation factor is valid:

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_{(k)c}(j) \cdot PL_{(k)c} + \Delta_{TF,c}(i) + f_c(i) + f_b(i) \end{Bmatrix}.$$

In another example, when the WTRU determines that it is in blockage and TPC are available, the WTRU may initiate a request to the serving cell to increase the rate of feedback of the TPC $f_c(i)$.

Power determination based on transmission characteristics is discussed herein. A WTRU may determine the power for a transmission (e.g., an UL transmission) based on at least one requirement, type, or characteristic of the transmission. A WTRU may determine the power for a transmission (e.g., an UL transmission) based on at least a service for which the transmission may be made.

A transmission may be a transmission of at least one of the following: a data channel (e.g., PUSCH); a control channel (e.g., a PUCCH); a reference signal, symbol or set of symbols (e.g., SRS); and a random access channel (PRACH). A transmission may be at least one of: a scheduled or granted transmission; a grant free or grant-less transmission; a transmission with allocated, scheduled, or granted resources; a transmission with configured resources; a transmission without allocated, scheduled, or granted resources; and a transmission for which a WTRU selects a set of resources for the transmission, for example from a set of configured resources (e.g., for grant free or grant-less transmission).

A transmission characteristic may be a transmission type, a transmission requirement, a transmission parameter, among others. A transmission characteristic may be a service for which a transmission may be made. A transmission characteristic may be associated with a service (e.g., a service type).

For example, a transmission characteristic may be at least one or a combination of the following: QoS; delay tolerance; reliability (e.g., reliability requirement); transmission error (e.g., target transmission error) such as 10^-3 or 10^-1; target SNR; enhanced mobile broadband (eMBB) transmission; low latency transmission; ultra-reliable low latency (URLLC) transmission; machine type communication (MTC) transmission; a bandwidth limited (BL), coverage enhanced (CE) or Narrowband (NB) transmission; whether the transmission is a first transmission (e.g., of a transport block or codeword) or a retransmission (e.g., of the transport block or codeword); and a number of beams on which the transmission may be made.

Power offset based on transmission characteristic is discussed herein. A power offset that may be based on at least one transmission characteristic may be provided and/or used.

A WTRU may determine the power for a transmission based on at least a transmission characteristic. The WTRU may use a power offset that may be, or may be determined, based on a transmission characteristic in the determination and/or calculation of the power for a transmission.

For example, a WTRU may use or include a power offset (e.g., power offset value) in a power determination for a transmission where the offset may be based on a transmission characteristic. The WTRU may receive a set of one or more power offset values where a power offset value may be associated with a transmission characteristic. The set of power offset values may be provided via configuration, for example from a TRP or gNB.

For example, a WTRU may receive a first power offset value to use for a low latency transmission (e.g., a URLLC transmission). The WTRU may receive a second power offset value to use for a delay tolerant transmission (e.g., a MTC transmission). The power offset values may apply to grant free transmission.

The WTRU may use the first power offset value in the determination of the power for a low latency grant-free transmission. The WTRU may use the second power offset value in the determination of the power for a delay tolerant grant free transmission.

In another example, for one or more transmission characteristics, the WTRU may not receive and/or use a power offset value. The WTRU may use a power offset value for a first transmission characteristic. The WTRU may not use a power offset value for a second transmission characteristic. For example, the WTRU may use a power offset value for a grant-free transmission or a URLLC transmission. The WTRU may not use a power offset value for a scheduled transmission, a delay tolerant transmission, or an eMBB transmission.

Subsequent to determining the power for a transmission, the WTRU may make the transmission using the determined power. Power adjustment may be realized using a power ramping process. Based on a use-case scenario, power ramping may be implemented in a ramp-up or ramp-down fashion.

For URLLC applications, a WTRU may use a ramp down approach for the power setting. In an example, the WTRU starts up its transmission at $P_{actual}=P_{req}+P_{offset}$, where $P_{actual}$, $P_{req}$ and $P_{offset}$ are the actual transmit power, the estimated required transmit power based on pathloss and other related parameters and a configured positive offset value, respectively. The initially configured $P_{offset}$ offset parameter may be defined for a specific set of use scenarios, like URLLC. The employed offset parameter may be configured per cell, or on a WTRU-specific basis. The offset value may be defined based on the required level of reliability and latency of URLLC transmission. For example, a higher $P_{offset}$ offset value would indicate a higher likelihood of a successful transmission, and thus higher reliability and lower latency.

While maintaining an expected level of reliability and latency, a WTRU may attempt to reduce and optimize the $P_{offset}$ value for interference management as well as power consumption reduction reasons, a WTRU may correct and reduce the $P_{offset}$ based on its perceived quality of the uplink channel. The correction step may be fixed, pre-configured, or determined by the WTRU, as discussed below First, a WTRU may reduce the $P_{offset}$ after experiencing $N_{succ}$ number of successful transmissions out of $N_{total}$ transmissions, where $N_{succ}$ and $N_{total}$ are dynamically or semi-statically configured parameters.

Second, a WTRU may reduce the $P_{offset}$, after receiving $M_{down}$ power down TPC commands out of $M_{total}$ TPC messages, where $M_{down}$ and $M_{total}$ are dynamically or semi-statically configured parameters.

Third, a WTRU may reduce the $P_{offset}$ based on a single or a subset of downlink signal power measurements. The decision may be based on L1/L3 filtered measurements or combinations thereof.

Fourth, a WTRU may maintain $P_{offset}$ value for a pre-configured number of transmission intervals, and only after expiring the period, it re-assesses the $P_{offset}$.

In an example, to assure that the transmit power is always maintained above or equal to the initially estimated $P_{req}$ value, $P_{offset}$ may not be adjusted to a value below a configured parameter $P_{offset\_min}$, $0 \leq P_{offset\_min} \leq P_{offset}$. For example, the actual transmit power $P_{actual}$ may be always defined as $P_{req}+P_{offset\_min} \leq P_{actual} \leq P_{req}+P_{offset}$. In an example, if following a correction of the $P_{offset}$ value, an uplink transmission failure occurs, the last m (m≥1) corrections on $P_{offset}$ may be reversed, or $P_{offset}$ may be reset back to its initially configured value.

For mMTC applications, a WTRU may use a ramp up approach for the power setting. In an example, the WTRU starts up its transmission at $P_{actual}=P_{req}-P_{offset}$, where $P_{actual}$, $P_{req}$ and $P_{offset}$ are the actual transmit power, the estimated required transmit power based on pathloss and other related parameters and a configured positive offset value, respectively. The initially configured $P_{offset}$ offset parameter may be defined for a specific set of use scenarios, like mMTC. The employed offset parameter may be configured per cell, or on a WTRU-specific basis. The offset value may be defined based on the level interference, battery life, modulation, etc. For example, a higher $P_{offset}$ offset value would result in a longer battery life and less inter-cell interference.

While maintaining an expected level of battery life and interference, a WTRU may reduce and optimize the $P_{offset}$ value for potential improvements in reliability and latency. In an embodiment, a WTRU may correct and reduce the $P_{offset}$ based on its perceived quality of channel. The correction step may be fixed, pre-configured, or determined by the WTRU.

In an embodiment, a WTRU may reduce the $P_{offset}$ after experiencing $N_{fail}$ number of failed transmissions out of $N_{total}$ transmissions, where $N_{fail}$ and $N_{total}$ are dynamically or semi-statically configured parameters. In an example, a WTRU may reduce the $P_{offset}$, after receiving $M_{up}$ power up TPC commands out of $M_{total}$ TPC messages, where $M_{up}$ and $M_{total}$ are dynamically or semi-statically configured parameters.

In an example, a WTRU may reduce the $P_{offset}$ based on a single or a subset of downlink signal power measurements. The decision may be based on L1/L3 filtered measurements, or a combination thereof. In an example, a WTRU may maintain $P_{offset}$ value for a pre-configured number of transmission intervals, and only after expiring the period, it re-assesses the $P_{offset}$.

In an example, to assure that the transmit power is always maintained below or equal to the initially estimated $P_{req}$ value, the $P_{offset}$ may not be adjusted to a value below a configured parameter $P_{offset\_min}$, $0 \leq P_{offset\_min} \leq P_{offset}$. For example, the actual transmit power $P_{actual}$ may be always defined as $P_{req}-P_{offset} \leq P_{actual} \leq P_{req}-P_{offset\_min}$.

In an example, if following a correction of the $P_{offset}$ value, an indication of excessive battery usage or interference appears, the last m (m≥1) corrections on $P_{offset}$ may be reversed, or $P_{offset}$ may be reset back to its initially configured value. A power offset value may be associated with a set of transmission characteristics. A set of transmission characteristics may be substituted for transmission characteristic and still be consistent with the examples described herein.

Power for retransmission based on transmission characteristic is discussed herein. Power for retransmission may be determined and/or adjusted based on a transmission characteristic of the retransmission. Retransmission may be of a signal or channel (e.g., a PUSCH).

Retransmission may be of a transport block or codeword, for example a transport block or codeword for which at least some of the corresponding coded bits may have been previously transmitted. Retransmission may include of at least part of a transport block or code word that was previously transmitted. Retransmission may include coded bits that were not previously transmitted. Retransmission may be transmission of a different redundancy version of a previous transmission.

A WTRU may determine or adjust the power of a transmission or retransmission based on at least a transmission characteristic. Subsequent to determining or adjusting the power for a transmission or retransmission, the WTRU may make the transmission or retransmission using the determined power.

Power ramping by a power step value is discussed herein. In an example, a power adjustment may be an increase by a power step value. The increase may be from the power used for the previous transmission or retransmission. A power step value may be provided via configuration, for example from a TRP or gNB.

For example, the WTRU may receive and/or determine a set of one or more power step values where a power step value may be associated with a transmission characteristic. The set of power step values may be provided via configuration, for example from a TRP or gNB.

In an example, the WTRU may use a first power step value (e.g., increase the power by a first power step value) when determining the power for a retransmission with a first transmission characteristic. The WTRU may use a second power step value (e.g., increase the power by a second power step value) when determining the power for a retransmission with a second transmission characteristic.

In another example, the WTRU may use a first power step value (e.g., increase the power by the first power step value) when determining the power for a retransmission with a first transmission characteristic. The WTRU may not use a power step value (e.g., may not increase the power by a power step value) when determining the power for a retransmission with a second transmission characteristic.

A power step value may be larger for a transmission with a more stringent requirement. For example a power step value may be larger for a transmission with a high reliability requirement than a transmission without a high reliability requirement. In another example a power step value may be larger for a transmission with a low latency requirement than a delay tolerant transmission. In another example a power step value may be larger for a transmission that is not delay tolerant than a delay tolerant transmission. A power step value may be associated with a set of transmission characteristics.

Transmission at fixed, configured, or maximum power is discussed herein. In an example, a power adjustment may be to set the power to a fixed, configured, or maximum power. A maximum power may, for example be a WTRU configured maximum power. The adjustment may be to set the power of a retransmission such as a first retransmission or an nth retransmission to a fixed, configured, or maximum power. The value of n may be configured.

Adjustment type determination is discussed herein. The WTRU may determine whether to adjust (e.g., increase) the power by a power step or set the power to a fixed, configured, or maximum power based on a transmission characteristic (or set of transmission characteristics). For example, the WTRU may use a first adjustment type for a first transmission characteristic and a second adjustment type for a second transmission characteristic.

In another example, the WTRU may use a first adjustment type for a first set of transmission characteristics and a second adjustment type for a second set of transmission characteristics. In another example, a transmission may be an UL grant-free transmission. In a first scenario, the transmission may be a delay tolerant transmission such as a MTC transmission. For a delay tolerant transmission, multiple retransmissions may be acceptable. In a second scenario, the transmission may not be delay tolerant or may have a high reliability requirement. For the second scenario, the number of acceptable retransmissions may be limited to 0, 1, or a small number. The WTRU may use a different adjustment type for the different scenarios.

Use of Transmit Power Control (TPC) commands based on transmission characteristic is discussed herein. A WTRU may use or ignore TPC commands based on a transmission characteristic. For example, for some transmission characteristics, a WTRU may use open loop power control (e.g., only open loop power control). For some transmission characteristics the WTRU may not use or may set the TPC accumulation value to 0 in its determination and/or calculation of power (e.g., for a channel). For example, the WTRU may use a power offset that may be determined based on a transmission characteristic or set of transmission characteristics, for example instead of used the TPC accumulator value.

Figure 5:
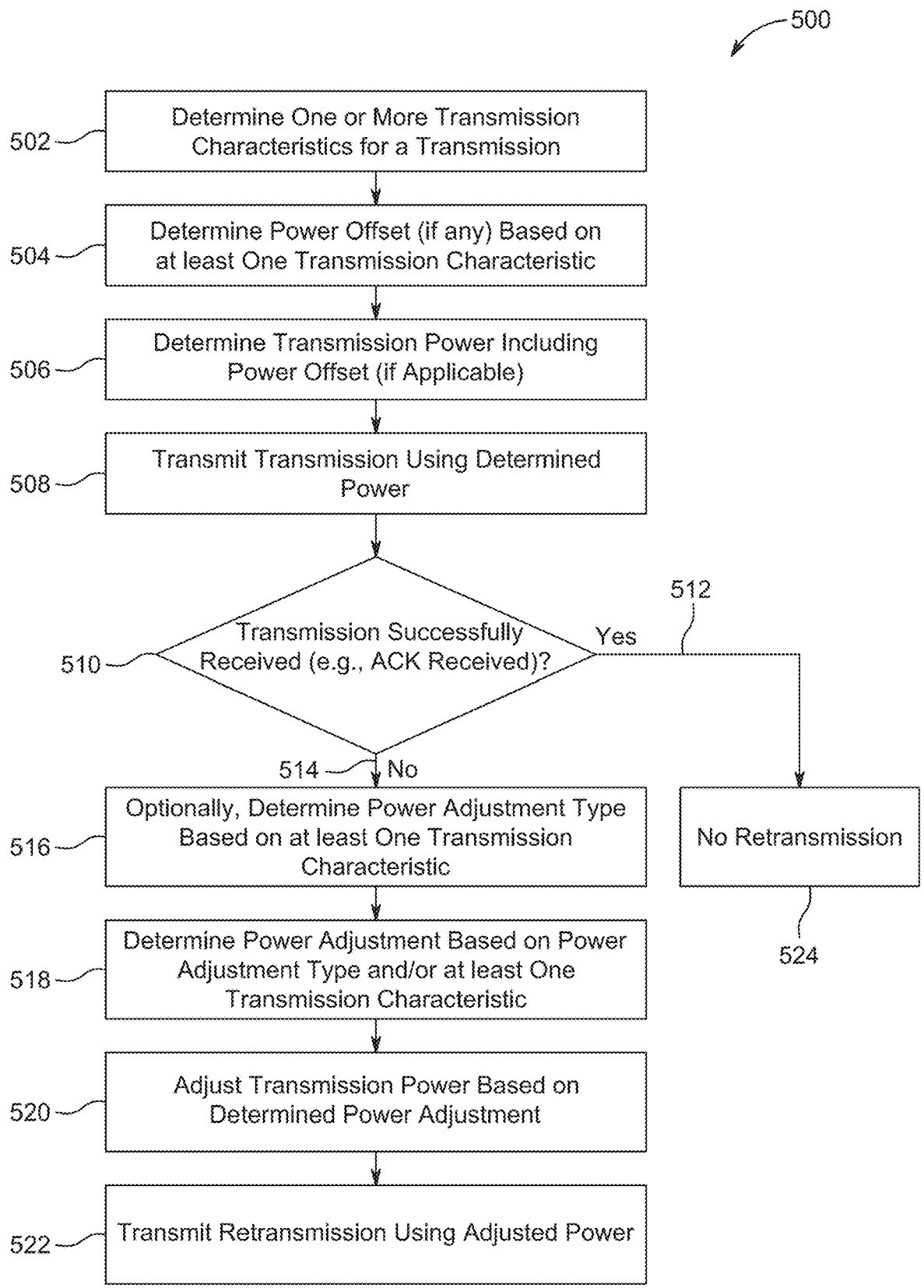
FIG. 5 shows an example of performing power determination at a WTRU based on at least one transmission characteristic.

FIG. 5 shows an example procedure 500 for performing power determination at a WTRU, based on at least one transmission characteristic. In the example, a WTRU may do anyone or a combination of the followings.

First, the WTRU may determine one or more characteristics for a new transmission or a retransmission. 502. Examples of those characteristics are grant free, delay tolerant, low latency, or high reliability. Next, the WTRU may determine power offset, if any, based on at least one of the above characteristics. 504. Then, the WTRU may determine transmission power including power offset, if applicable. 506. Then, the WTRU transmit uplink data using the determined power 508.

Next, the WTRU determines whether the uplink data transmitted by the WTRU using the determined power were successfully received by the access point 510. If the WTRU receives an indication, such as acknowledgment (ACK), of successful transmission from the access point for the transmitted uplink data 512, the WTRU does not retransmit the uplink data. 524. If the uplink data transmitted by the WTRU using the determined power were not successfully transmitted to the access point, thus the WTRU may not receive the indication 514, optionally, the WTRU may determine power adjustment type, based on at least one transmission characteristic, such as power ramp for grant free, delay tolerant, high reliability, maximum power for grant free, or high reliability. 516.

Then, the WTRU may determine power adjustment based on power adjustment type or at least one transmission characteristic. 518. Then, it may adjust transmission power based on the determined power adjustment. 520. Finally, it may perform retransmission using the adjusted power. 522.

Path loss estimation in NR power control is discussed herein. Path loss estimation in NR power control should consider the specific type of reference signal used, and factor in beam gains based on the beams or beam-pair links used.

RS used to Estimate PL is discussed herein. In LTE, downlink PL is estimated as: Path Loss=referenceSignalPower−higher layer filtered RSRP, where referenceSignalPower is cell-specific and provided by higher layer signaling, and RSRP is always averaged with L3 filtering.

In beam-based NR, the downlink the choice of reference signal used to measure the reference signal power is important due to the lack of a non-precoded common reference signal. The presence of beam gains of the DL and UL beams in the beam-pairs also affects the measured path loss. Thus, the true path loss becomes: Path Loss=referenceSignalPower−filtered RSRP, where the referenceSignalPower is beam specific and the path loss includes the gains of the transmit and receive beams in the BPL. The choice of the layer to filter the RSRP depends on the periodicity of the beam or beams and the variation in the interference due to beam interference from other TRPs in the system. L3 filtering may be inadequate in this case.

Knowledge of the received signal strength indicator (RSSI) estimated based on the RS used, the gains of the beams in the BPL and the transmit power of the system may enable the WTRU estimate the path loss of the channel and in turn enable beam based TPC. In one example, the WTRU may have different TPC loops for each RS type based on the accuracy possible with the specific RS type. In one example, the WTRU may have a single TPC loop but update the PL in the RS based on the specific RS received.

As an example, the WTRU may calibrate the difference between an estimate from SS based PL estimation and channel state information reference signal (CSI-RS) based path loss estimation and use the offset to update its single path loss estimate based on the RS type used to estimate the PL. As an example, the WTRU may feedback the PL estimate the gNB for each SS type and the gNB may use this information and the path loss it estimates to calibrate the accuracy of the PL estimate for different RS types. The gNB may signal this information to the WTRU and may use this information in deciding its RS configuration e.g. the periodicity of the CSI-RS and SS for example.

A WTRU may be indicated of a quasi co-located (QCL) state to apply a same receive beam forming for measurement on some of downlink reference signals. For example, a gNB may indicate QCL of the SSB and another downlink reference signal, such as CSI-RS. In one example, where there is a QCL between an SSB and an aperiodic CSI-RS, a WTRU may perform a pathloss measurement on the aperiodic CSI-RS, when available, to calculate an estimate of the power offset between the measured SSB power and the CSI-RS.

A WTRU may apply the estimated power offset on the SSB signal when the aperiodic CSI-RS is not transmitted. In one example, the estimated offset used may be averaged over multiple aperiodic CSI-RS receptions to improve the accuracy of the estimate. Examples to improve the estimate may include any one or a combination of the following. In one example, the estimate may include simple time averaging over multiple estimates: offset=sum(offset_i)/N, i=0, 1, ..., N−1.

In another example, the estimate may include using an exponential smoothening filter over multiple estimates to give more weight to more recent estimates,
offset 0=estimate_0
offset_i=alpha×offset_{i−1}+(1−alpha) estimate_i, 0<alpha<1, alpha=constant.

In another example, the estimate may include using an exponential smoothening filter with the exponential weighting according more weight to recent PL estimates and factoring in the time differences between the estimates. This is due to the aperiodic nature of the estimate arrivals:
offset 0=estimate_0
offset_i=alpha×offset_{i−1}+(1−alpha) estimate_i, 0<alpha<1,
alpha=function (time_i−time_{i−1})

In another example, a timer may be introduced to indicate whether the measured PL based on the CSI-RS may be outdated. Upon expiry of the timer, the WTRU may switch to SSB based PL, by re-setting the averaging filter. It is noted that the exponential smoothening filter with a timer based parameter may do this automatically.

The following are the possible RS choices for NR PL estimation:

TABLE 1

| RS types | Time of Use | Beam/WTRU specific |
| --- | --- | --- |
| Synchronization Sequence | Used in time before initial access, before CSI-RS config, when CSI-RS not available | Beam specific |
| May be primary, secondary or tertiary SS used or combination of all | | |
| Broadcast RS | Used in time before initial access, before CSI-RS config, when CSI-RS not available. | Beam specific |
| Mobility-based RS | Used after initial access, before CSI-RS config, when CSI-RS not available | Beam specific |
| CSI-RS | Used in connected or idle mode, when BPL is set up | WTRU specific |
| WTRU DMRS for data | Typically precoded. May not be useful | WTRU specific |

It may be necessary for the gNB to indicate an RS configuration for the WTRU to measure the PL. The following procedure may be followed by the WTRU to enable RS configuration for TPC.

The gNB indicates RS properties e.g. periodic/aperiodic, periodicity etc. This may be indicated during beam setup in the beam broadcast channel. Then, the gNB indicates RS for TPC path loss measurement (pre CSI-RS configuration: SS or mobility reference signal (MRS)) (post CSI-RS configuration: CSI-RS). Next, the gNB indicates parameters for path loss measurement. This is an L3/L2/L1 filtering parameter for measurement over multiple arrivals. In another example, this is a one shot measurement.

The gNB may then indicate relationship between RS measurement types (e.g., offset between CSI-RS and SS PL measurement). This may be a function of the beams/beam-pairs used to the estimate accuracy based on periodicity, density, filtering etc. The WTRU may autonomously determine this and inform the gNB.

Factoring in beam gains is discussed herein. The WTRU may need to know transmit and Rx beam gains to estimate the PL (or estimate the gain offset between RS types) to enable an update of its path loss based on the specific RS available. In one example, the gNB and WTRU may fold the gain into path loss estimate. In another example, the transmitter may signal the gain with the transmission with the transmitter's transmit power. The receiver may estimate the PL based on RSRP and knowledge of Rx gain. This allows the WTRU to have a good initial estimate of the transmit power needed when there is a switch to another Tx beam. The initial beam management procedures (P1/U1) and refinement procedures may incorporate the estimation of transmit and receive beam gains into the procedures.

Power Control with/without a Beam Correspondence is discussed herein. A beam reciprocity may be used or defined for the case that a receiver may determine a proper Tx beam (or best Tx beam) based on the Rx beam determined. In an example, if a beam reciprocity holds at a WTRU, the WTRU may determine uplink Tx beam based on the Rx beam determined for a downlink signal reception. In another example, if a beam reciprocity holds at a gNB, the gNB may determine downlink Tx beam for a WTRU based on the Rx beam determined for an uplink signal reception from the WTRU. A WTRU and/or a gNB may indicate a capability or a support of beam reciprocity. Hereafter, beam reciprocity and beam correspondence may be used interchangeably.

A set of beams or beam-pair links (BPLs) may be configured, determined, or used for one or more uplink channel, wherein a subset of beams or BPLs may be used for an uplink transmission. For an uplink transmission, the transmission power may be determined based on the subset of beams or BPLs determined for the uplink transmission. For example, NB beams or BPLs may be configured or used for one or more uplink channel and one out of NB beams or BPLs may be selected or determined for an uplink transmission, wherein the transmission power may be determined based on the beam or BPL selected or determined. Any one or more of following may apply.

A beam or BPL may correspond to at least one of following: a beam index or beam identification number; a CSI-RS resource or port index; a SRS resource index; a spatial QCL index; and a SS block index. A beam or a BPL may be interchangeably used with a beam group or a BPL group.

An uplink power control loop may be based on a beam or a BPL, wherein one or more power control parameters may be determined as a function of a beam or a BPL. One or more open-loop power control parameters (e.g., PL) may be determined as a function of beam or BPL. For example, each beam or BPL may be configured or determined with its associated downlink signal (e.g., CSI-RS resource, SS block) for PL measurement and if a beam or BPL is determined for an uplink transmission, the PL measured from the associated downlink signal may be used to determine the uplink transmission power.

One or more closed-loop power control parameters (e.g., TPC command) may be determined as a function of beam or BPL. For example, a WTRU may receive a TPC command for an uplink transmission with a beam or a BPL, the WTRU may accumulate or apply the power offset value from the TPC command on the closed-loop power control parameter which may be associated with the beam or BPL.

One or more uplink power control types may be used when multiple beams or BPLs may be used for uplink transmission. A first type of uplink power control scheme (e.g., Type-1 power control; Type-1 PC) may be used when a WTRU may have a beam correspondence capability and a second type of uplink power control scheme (e.g., Type-2 power control; Type-2 PC) may be used when a WTRU may not have a beam correspondence capability.

A WTRU may be configured with the type of uplink power control scheme via a higher layer signaling. Which types of uplink power control scheme to use may be determined based on the WTRU capability (e.g., beam correspondence capability). If a WTRU has a beam correspondence capability, the first type of uplink power control scheme may be used and if a WTRU has no beam correspondence capability, the second type of uplink power control scheme may be used.

A beam or BPL indication for an uplink transmission may be determined based on a PC type. For example, a downlink reference signal (e.g., CSI-RS resource index) may be indicated for an uplink transmission when Type-1 PC is used while an uplink reference signal (e.g., SRS resource index) may be indicated for an uplink transmission when Type-2 PC is used.

A set of beams or BPLs used for a downlink transmission may be reused for an uplink transmission when Type-1 PC is used. A set of beams or BPLs used for a downlink transmission may be different from the set of beams or BPLs used for an uplink transmission when Type-2 PC is used.

When Type-1 PC is used, a WTRU may receive a downlink reference signal index (e.g., CSI-RS resource index) to determine a beam for an uplink transmission and a path loss for its associated uplink power control. When Type-2 PC is used, a WTRU may receive an uplink reference signal index (e.g., SRS resource index; SRI) as a beam or a BPL index to determine a beam for an uplink transmission and at least one of following may be used to determine a path loss for the uplink power control.

A WTRU may receive a downlink reference signal index (e.g., CSI-RS resource index). A predetermined downlink signal may be used. For example, an SS block which may be selected or determined by the WTRU during initial access procedure may be used for the path loss measurement. In this case, the path loss may be the same irrespective of the uplink beam selected or determined for an uplink transmission.

An associated SS block. For example, a beam or a BPL indicated for an uplink transmission may be associated with an SS block and the WTRU may measure a path loss for uplink PC from the associated SS block when a beam or a BLP is indicated for an uplink transmission.

A WTRU may receive a path loss value from the gNB. For example, a WTRU may receive a path loss for each uplink beam or BPL via higher layer signaling (e.g., radio resource control (RRC) or medium access control element (MAC-CE)). A WTRU may use its associated path loss value when the WTRU is indicated to use a beam for an uplink transmission to determine an uplink transmission power. A first DCI may be used for Type-1 PC and a second DCI may be used for Type-2 PC.

The first DCI may include a beam indication field for uplink beam determination and path loss measurement (or which DL signal to use for path loss compensation). The second DCI may include a beam indication field for uplink beam determination and another beam indication field for path loss measurement (or which DL signal to use for path loss compensation).

A WTRU may be configured to monitor both the first DCI and the second DCI for an uplink transmission. If a WTRU received a first DCI, the WTRU may perform the Type-1 PC for the granted UL transmission. If a WTRU received a second DCI, the WTRU may perform Type-2 PC for the granted UL transmission.

The first DCI may be monitored in all subframes (or slots) and the second DCI may be monitored in a subset of subframes (or slots) if the WTRU has beam correspondence capability, where the all subframes (or slots) may be the subframes (or slots) in which the WTRU may potentially receive at least one of the DCIs.

The second DCI may be monitored in all subframes (or slots) if the WTRU has no beam correspondence capability.

The first DCI and the second DCI may be monitored in all subframes (or slots) if the WTRU is configured to monitor both the first DCI and the second DCI.

The first DCI and the second DCI may the same DCI format while a bit flag may indicate the DCI type. For example, a bit flag may be located in a predetermined location in a DCI format and if the bit flag is a first state (e.g., bit flag=0), the first DCI may be used or determined and if the bit flag is a second stage (e.g., bit flag=1), the second DCI may be used or determined.

A radio network temporary identifier (RNTI) may be used to indicate the DCI type. For example, a first RNTI may be used to scramble CRC of the DCI format if the first DCI is used and a second RNTI may be used to scramble CRC of the DCI format if the second DCI is used.

UL/DL PC in decoupled networks is discussed herein. Decoupled operation may be similar to operation without beam correspondence. With decoupled operation, a DL beam or BPL may be received from one TRP and an UL beam or BPL (e.g., the corresponding UL beam or BPL) may be transmitted to another TRP. Use of a path loss (PL) measurement for a DL beam or BPL from a first TRP may not be sufficient as an estimate of the PL for an UL beam or BPL to a second TRP, for example, to use for power control in the second TRP.

A WTRU may receive configuration of a DL beam or BPL that may be transmitted by the second TRP to use for at least a PL measurement, (e.g., for the power control for transmission to the second TRP). The DL beam or BPL may be used for a PL measurement and may not be used for data transmission to the WTRU or data reception by the WTRU. The DL beam or BPL may be used for time and/or frequency synchronization, e.g., for UL transmissions to the second TRP. Alternatively, the WTRU may (e.g., autonomously) determine the DL beam or BPL of the second TRP to use for time and/or frequency synchronization. Alternatively, the WTRU may be configured with a DL beam or BPL that may be transmitted by the second TRP to use for at least time and/or frequency synchronization with the second TRP.

In an example, a WTRU may receive configuration or indication of a DL beam or BPL to use for a PL measurement for an UL beam or BPL. A DL beam or BPL that may be used for a PL measurement may be referred to herein as a PL reference beam or BPL. The configuration may include an indication of the UL beam or BPL with which the PL reference beam or BPL may be linked or for which the PL reference beam or BPL may be a reference.

A PL reference beam or BPL may be transmitted by or associated with the same TRP as the UL beam or BPL for which the PL reference beam or BPL may be a reference. The PL reference beam or BPL may be a DL beam or BPL for which the WTRU may not monitor a DL control channel or from which the WTRU may not receive data. The WTRU may receive an indication or a configuration indicating a DL beam or BPL is at least one or a combination of: a PL reference beam or BPL; a PL reference beam or BPL only; a measurement (e.g., PL) beam or BPL; a measurement-only beam (e.g., PL) or BPL; and a beam or BPL for time and/or frequency synchronization (e.g., with a TRP or for an UL beam, BPL, or transmission).

The WTRU may receive timing information for a PL reference beam or BPL, for example, so the WTRU may know when to measure the beam or BPL. The timing information may include sync burst and/or sync block timing information and one or more offsets with respect to a sync burst or sync block. The timing information may include information regarding when the measurement signals may be present or when to measure the signals.

The WTRU may be configured with measurement gaps, for example, so the WTRU may switch its receiver to the frequency of the PL reference beam or BPL to make measurements. During the measurement gaps the WTRU may not or may not be required to monitor a DL control channel or receive DL data, for example, on a frequency other than the measurement frequency.

A WTRU may receive a configuration that provides the transmit power of one or more measurement signals of a DL beam or BPL such as a PL reference beam or BPL. A WTRU may measure a PL reference beam or BPL to determine a PL. The WTRU may use a measurement of a PL reference beam or BPL and a configured transmission power for a transmission on a PL reference beam or BPL to determine a PL. The WTRU may use the PL in the determination of power for an UL beam or BPL for which the PL reference beam or BPL is a reference. The WTRU may determine a power for transmission using a determined PL. The WTRU may transmit a channel using the determined power.

Configuration of a PL reference beam may be provided and/or received via signaling such as RRC signaling or via a DCI. Configuration of timing or parameters for a PL reference beam may be provided and/or received via signaling such as RRC signaling or via a DCI. A WTRU may perform PL measurement based on the DL TRP transmission, and then apply an offset value to estimate the PL for the UL TRP transmission.

A WTRU may perform raw PL measurements on both DL and UL TRPs to estimate the required offset value by computing the difference in the raw measurements. A raw measurement may be in form of an RSSI, measurements done using block signals such as broadcast, synchronization, control, etc. A raw measurement may not necessarily require an accurate synchronization, equalization and/or decoding.

In an alternate example, a WTRU may be indicated an estimated offset value for its UL transmission from the DL TRP. In an example, a gNB may determine the relative location of a WTRU with respect to the DL and UL TRPs, and then estimate the required offset value. The offset value is then indicated to the WTRU by the DL TRP. The determination of the WTRU location may be transparent to WTRU, for example through triangulation. Alternatively, it may be WTRU-assisted by relying on geo-location recovery feature of the WTRU.

SRS power is discussed herein. A WTRU may transmit a set of SRS transmissions for one or more purposes. For example the set of SRS transmissions may be used to determine PL, to measure a channel, or to determine a beam or BPL (e.g., a best beam or BPL) that may be used for transmission and/or reception. The number of SRS transmissions in the set may be N. N may be an integer greater than or equal to 1. The value of N may be configured. The value of N may be provided with a trigger or request to perform an SRS transmission (e.g., a set of SRS transmissions) such as an aperiodic SRS transmission, for example in a DCI.

The power a WTRU may use for an SRS transmission may be a function of the type of SRS transmission or the purpose for which the SRS transmission may be used. A WTRU may be configured with one or more types of SRS transmissions. A type may be or may be associated with a purpose. A purpose may be at least one of PL determination, channel measurement, or beam or BPL selection or determination. A WTRU may determine the power to use for an SRS transmission based on at least the type or purpose of the transmission. The WTRU may transmit the SRS transmission with the determined power.

A WTRU may transmit a set of N SRS transmissions serially. The WTRU may be configured, requested or triggered to transmit the set of SRS transmissions. The WTRU may transmit a set of SRS transmissions based on receipt of a request or trigger to transmit the set and/or according to a configuration. An SRS type may be included with an SRS request or trigger (e.g., in a DCI that includes the SRS request or trigger).

Each SRS transmission within a set of SRS transmissions may correspond to an UL beam or BPL and/or a DL beam or BPL. A set of N SRS transmissions may correspond to up to N beams or BPLs in the UL and/or DL. Transmission of a set of SRS transmissions may be periodic or configured to be periodic. Transmission of a set of SRS transmissions may be triggered or event driven. An SRS type may be included with an SRS configuration.

Two or more SRS transmissions in a set of SRS transmissions may use (e.g., may be transmitted with) the same or similar power, for example, to enable the gNB or TRP to perform a comparison among the received transmissions. A SRS transmission in a set of SRS transmissions may use (e.g., may be transmitted with) a known power to enable the gNB or TRP to determine a PL.

A WTRU may determine a first power for a SRS transmission in a set of SRS transmissions. The first power may be a calculated power. The first power may be determined separately or independently from a power determination for another SRS transmission or all other SRS transmissions in the set of SRS transmissions.

A WTRU may determine a second power for a SRS transmission in the set of SRS transmissions. The second power may be the power that the WTRU may use for the SRS transmission. The second power may be a power that the WTRU may use for all the SRS transmissions in the set of SRS transmissions.

A WTRU may determine a first power and/or a second power for an SRS transmission that may be in a set of SRS transmission. A WTRU may transmit an SRS that may be in a set of SRS transmissions using the first power or the second power that the WTRU determined for the SRS transmission or for the set of SRS transmissions. The WTRU may transmit an SRS that may be in a set of SRS transmissions using the first power or the second power based on the type of the SRS transmission.

For example, the WTRU may use the first power for a first SRS type or purpose such as channel measurement. The WTRU may use the second power for a second SRS type or purpose such as PL determination or beam/BPL selection/determination.

A WTRU may receive or be configured with, for example via higher layer signaling such as RRC signaling or via a DCI, at least one or a combination of the following: a type or purpose for an SRS transmission or a set of SRS transmissions; a power value P to use for an SRS transmission or a set of SRS transmissions; an indication to use a configured power value for an SRS transmission or a set of SRS transmissions; an indication to use a maximum power for an SRS transmission or a set of SRS transmissions; an indication to use a constant, same, or similar power for a set of SRS transmission; an indication of a reference beam (e.g., by the index of the beam); and an indication to use a reference beam power.

The DCI may be the DCI that includes a request or trigger to transmit an SRS transmission such as a set of N SRS transmissions. In an example, a WTRU may receive and/or use a power value P for a set of N SRS transmissions. The WTRU may receive an indication to use a configured value (e.g., P) for the power for the set of N SRS transmissions. For example, the WTRU may transmit the set of N SRS transmissions using the configured value based on the receipt of the indication to use the configured value or based on the configured or indicated type of SRS transmission. A WTRU may determine (e.g., prior to transmission of one or more of the N SRS transmissions) whether a maximum power may be exceeded when the configured power is used.

The WTRU may determine a maximum power for a SRS transmission. For example, the WTRU may determine maximum powers Pmax-1, Pmax-2, . . . , Pmax-N for each of N SRS transmissions, respectively. The WTRU may determine the maximum power for one or more SRS transmissions separately or independently. The WTRU may determine a maximum power that may apply to all the SRS transmissions in a set of SRS transmissions. For example, the WTRU may determine a maximum power Pmax-all that may apply to each or all of a set of N SRS transmissions. In an example, Pmax-all may be the smallest value (e.g., lowest power) among Pmax-1, Pmax-2, . . . , Pmax-N.

If the WTRU determines that use of a determined, received or configured value P may result in at least one of the N SRS transmissions exceeding a maximum power (e.g., for the time period during which the transmission may be made), the WTRU may scale or reduce the power of at least one of the N SRS transmissions. The WTRU may scale or reduce the power or powers such that all of the transmissions do not exceed a maximum power. The power for the N SRS transmissions may be scaled or reduced equally, for example, such that the same power may be used for the N SRS transmissions.

For example, if the WTRU determines that P is greater than Pmax-i for SRS transmission i in a set of N SRS transmissions or greater than Pmax-all, the WTRU may use P' for the power of SRS transmission i. The WTRU may or may also use P' for the power of another SRS transmission or all the SRS transmissions in the set of N SRS transmissions. P' may be Pmax-i (or another lower value). SRS transmission i may be the SRS transmission in the set of N SRS transmissions with the lowest Pmax-i.

In another example, a WTRU may transmit each of the N SRS transmissions using a maximum power. The WTRU may receive an indication to use a maximum power for the power for the set of N SRS transmissions. The WTRU may transmit the set of N SRS transmissions using a maximum power, for example, based on the receipt of the indication to use a maximum value or based on the configured or indicated type of SRS transmission. The WTRU may determine a maximum power for each of the N SRS transmissions, for example Pmax-1, Pmax-2, . . . , Pmax-N and/or Pmax-all. The WTRU may transmit each of the SRS transmissions in the set of SRS transmissions with its determined power or maximum power. The WTRU may select the lowest of the set of maximum power values as the value to use for transmission of each of the N SRS transmissions. The WTRU may transmit each of the SRS transmissions in the set of SRS transmissions with the selected maximum power value.

A WTRU may receive one or more types of SRS requests (e.g., aperiodic SRS requests). A first request type may be used to indicate to use a first power such as a calculated, normal or regular power. A second request type may indicate to use a second power such as a configured or maximum power. The power to use may be applicable for at least one SRS transmission in the set of N SRS transmissions. A WTRU may determine one or more transmission powers and transmit one or more SRS transmissions according to the SRS request (e.g., the type of SRS request). In another example, a WTRU may determine a first power for each of the N SRS transmissions in the set and may use the highest one, $P_{high}$, for all of the N SRS transmissions in the set.

If the WTRU determines that use of the $P_{high}$ value may result in at least one of the N SRS transmissions exceeding a maximum power (e.g., for the time period during which the transmission may be made), the WTRU may scale or reduce the power of the N SRS transmissions such that at least one of the transmissions do not exceed a maximum power. The power for the N SRS transmissions may be scaled or reduced equally, for example, such that the same power may be used for the N SRS transmissions.

A beam may be used herein to represent a directional transmission (or reception) and/or a transmission (or reception) using multiple antenna ports where beamforming may be applied. Beamforming may be applied in the analog domain and/or digital domain such via phase shifting and/or precoding.

A WTRU beam may be known to a TRP or gNB by a measurement and/or an index. A TRP or gNB beam may be known to a WTRU by a measurement and/or an index. A beam-pair link (BPL) may be substituted for beam and still be consistent with the examples described herein.

A WTRU may determine a beam or a set of beams for transmission of a SRS, such as a set of SRS transmissions. The beam or set of beams may be, may include, or may be based on any one or a combination of the following: a set of serving beams (or BPLs) of the WTRU (e.g., in the UL and/or DL); a best (e.g., strongest) beam or a best (e.g., strongest) serving beam (e.g., determined based on one or more SS-block and/or CSI-RS measurements); a beam or set of beams from which an SS-block and/or a CSI-RS measurement exceeds a threshold; a set of adjacent beams (e.g., to the set of serving beams, best beam, or best serving beam); a number of beams supported by the WTRU; a configured number of beams (e.g., for a SRS transmission) that may be less than or equal to the number of beams supported by the WTRU; a result of whether beam correspondence applies (e.g., between DL and UL); a configured or indicated set of beams (e.g., based on an index or set of indices that may have been determined during a process or procedure such as beam-pairing); and a SRS trigger type or purpose.

Configuration and/or indication may be from a gNB or TRP. Configuration and/or indication may be via higher layer signaling such as RRC signaling and/or physical layer signaling such as in a DCI. The DCI may be the DCI used to trigger (e.g., initiate) the SRS transmission (e.g., the set of SRS transmissions).

In an example, the set of serving beams (or BPLs) may be a set of Ns beams in the UL and/or DL. The number of beams to use for a SRS transmission may be N1 beams. The number of beams to use for a SRS transmission, may be the number supported by the WTRU, the number configured (e.g., for a SRS transmission) and/or the number triggered for a SRS transmission. The number of beams to use may be a function of the number and/or set of SRS resources configured such as by higher layer signaling and/or the physical layer trigger (e.g., DCI) to perform a SRS transmission.

For a beam in the DL (e.g., a serving beam in the DL), the WTRU may have an associated or corresponding beam in the UL. The UL and DL beams (e.g., directions) may be the same or similar, for example when beam correspondence applies. The association or correspondence between an UL and a DL beam may be based on a configuration or a beam-pairing procedure. The association or correspondence between an UL beam and a DL beam may be according to a BPL that may link the UL beam and the DL beam.

The set of Ns beams may be the set of UL beams that corresponds to the set of serving beams (e.g., of the WTRU) where the set of serving beams may be in the DL or the set of serving beams may be a set of BPLs. The WTRU may transmit a SRS transmission on the set of Ns serving beams and N1-Ns additional (e.g., adjacent beams), for example when N1>Ns.

A WTRU may transmit a SRS transmission on the best or strongest beam (e.g., the best or strongest serving beam) and one or more beams that may be adjacent to that beam. The WTRU may be configured (e.g., triggered such as by physical layer signaling and/or a DCI) to transmit SRS using N1 beams or on N1 SRS resources. The WTRU may transmit a SRS transmission using the best beam and N1-1 additional (e.g., adjacent) beams.

If the WTRU is capable of supporting Nc beams and the WTRU is requested to transmit a SRS transmission on more than Nc beams (e.g., N1>Nc), the WTRU may repeat transmission of the SRS on one or more of the same beams. For transmission of SRS on N1 beams, the WTRU may transmit on a set of Ns serving beams or a set of Nb best beams plus N1−Ns or N1−Nb additional beams that may be adjacent beams. For N1−Ns (or N1−Nb) an even number, the WTRU may transmit the same number of additional or adjacent beams on each side of the Ns or Nb beams. When N1−Ns (or N1−Nb) is an odd number, the WTRU may transmit n beams on one side and n+1 beams on the other side where 2n+1=N1−Ns (or N1−Nb).

An SRS resource may correspond to a set of resources in time and/or frequency, such as a set of PRBs, subcarriers, symbols, slots, and/or mini-slots, among others. For example, an SRS resource may correspond to a set of subcarriers in frequency and a symbol in time. A WTRU may transmit a SRS (e.g., for a beam) on at least one SRS resource.

A WTRU may determine a set of one or more beams for transmission of SRS. A WTRU may be configured with (e.g., receive a configuration for) a set of SRS resources (e.g., in time and/or frequency). The WTRU may transmit a SRS for a beam in the set of beams on at least one SRS resource in the configured set of SRS resources.

A WTRU may indicate (e.g., to a TRP or gNB) the number of beams it may have, support, and/or use (e.g., for transmission in the UL such as a SRS transmission in the UL). The WTRU may indicate the number of beams as a capability of the WTRU.

A WTRU may indicate (e.g., to a TRP or gNB) the number of SRS resources it may be capable of supporting SRS transmission (e.g., serially and/or in parallel). Transmission serially may comprise transmission in separate (e.g., non-overlapping) resources in time. Transmission in parallel may comprise transmission in at least partially overlapping resources in time. In an example, a WTRU may have, support and/or use Nc beams, for example for a SRS transmission. The WTRU may be configured to use a subset of the Nc beams for a SRS transmission.

The WTRU may make measurements on SS-blocks and/or CSI-RS resources to determine a best SS-block, and/or a best CSI-RS resource. The WTRU may make measurements on SS-blocks and/or CSI-RS resources to determine one or more SS-blocks and/or CSI-RS resources that may exceed a threshold.

The WTRU may determine a set of beams or beam directions for a SRS transmission based on the measurements of the SS-blocks and/or CSI-RS resources. For example, the WTRU may determine an UL beam for transmission based on the best SS-block or CSI-RS resource. The other beams may be adjacent to the determined UL beam. The WTRU may determine a set of beams or beam directions for a SRS transmission based on the current serving beam or beams.

The WTRU may determine the direction of an UL beam based on the direction of one or more DL beams. For example, a WTRU may determine a direction of an UL beam based on reception and/or measurements in the DL of one or more SS blocks and/or CSI-RS resources.

Figure 6:
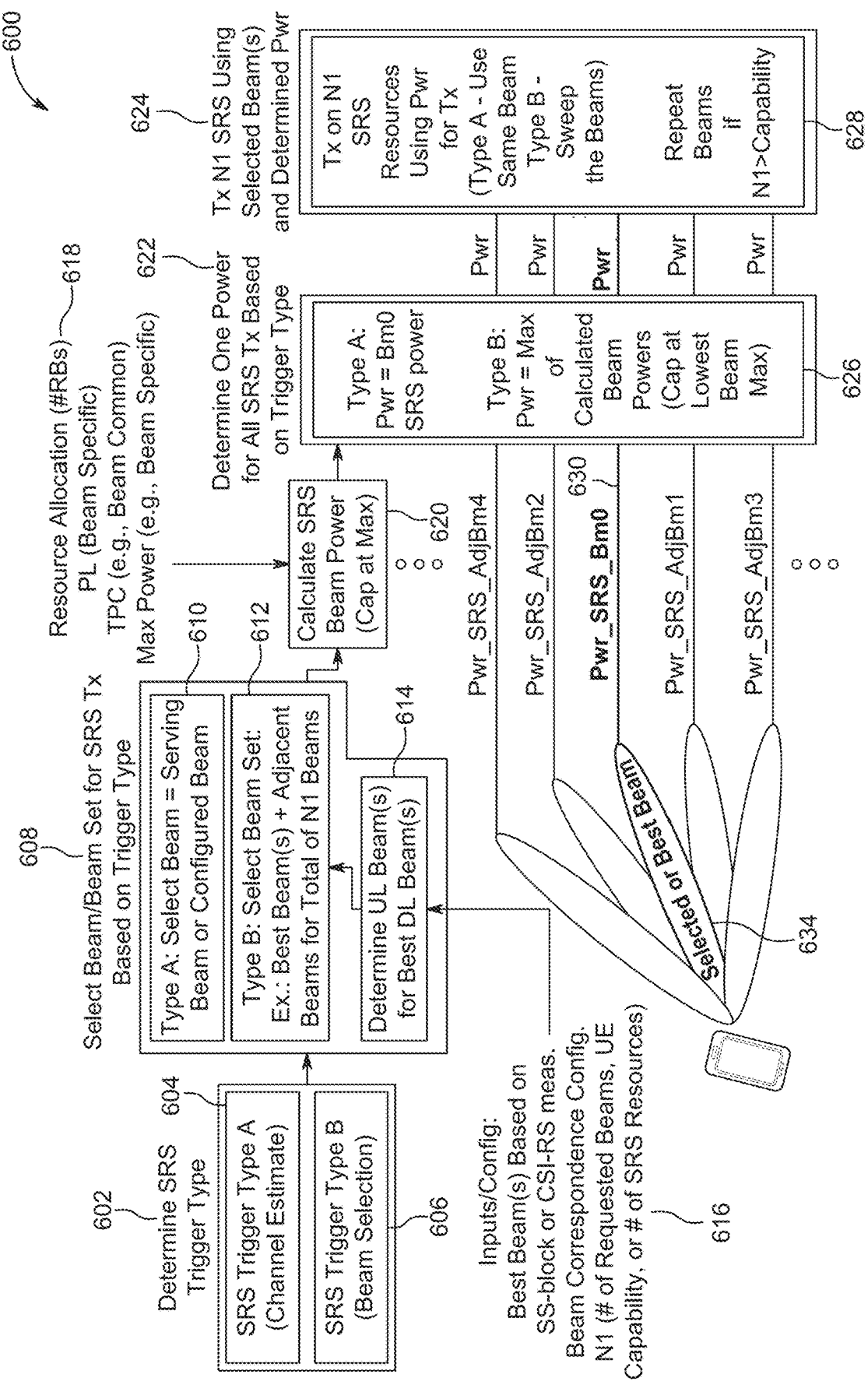
FIG. 6 shows a diagram for performing sounding reference signal (SRS) transmissions based on SRS trigger type according to one example.

FIG. 6 shows a diagram 600 for performing SRS transmissions based on SRS trigger type according to one example. As shown in FIG. 6, a WTRU may receive a configuration or trigger to perform one or more SRS transmissions. The configuration or trigger may include an indication of the type of SRS transmission. The SRS trigger type may be a first type (e.g., Type A) 604 or a second type (e.g., Type B) 606. Type A may be for channel estimation. Type B may be for beam selection. The WTRU determines a SRS trigger type, such as SRS trigger type A and SRS trigger type B. 602. The WTRU may determine the type of SRS transmission to perform based on the configuration, trigger, or indication. The WTRU may make the determination of the type of SRS based on at least one of: the type or contents of the DCI providing the trigger, an RNTI, the SRS resources configured or indicated, and/or an explicit indication such as a type flag.

The WTRU may select a beam or beam set for SRS transmission based on the SRS type (e.g., SRS trigger type) 608. For example, the WTRU may select a serving beam or a configured beam for SRS transmission for a first SRS type (e.g., Type A). 610. The WTRU may select a set of beams for a second SRS type (e.g., Type B). 612. The set of beams may include best beams and adjacent beams for total N1 beams, where N1 is the number of requested beams or number of SRS resources 616. The WTRU may determine UL beams for best DL beams based on SS-block, CSI-RS measurement, or beam correspondence configuration 614. In another example, the WTRU may select a set of beams based on different or separate criteria for a first SRS type and a second SRS type. The total number of beams selected may be the configured or indicated number of beams, the WTRU beam capability (e.g., SRS beam capability), or the smaller of the two.

The WTRU may calculate a beam specific power for the selected one or more beams. 620. Pathloss may be beam specific. 618. TPC may be beam specific or common for one or more (e.g., all beams). 618. Maximum power may be beam specific or common for one or more (e.g., all beams). 618. A beam specific power may be determined based on at least one value or parameter that may be specific to the beam. A value or parameter may be specific to a beam when the value or parameter is measured or configured for the beam separately or independently from at least one other beam.

The WTRU may determine a power to use for transmission of SRS for one or more beams such as all the beams or for one or more SRS resources such as all the SRS resources associated with a transmission of a set of SRSs (e.g., for a trigger) that may be transmitted serially and/or in parallel. 622.

The determination of the transmission power may be based on the SRS type. For example, for a first type, the SRS transmission may be a single SRS transmission or a set of SRS transmissions using a same beam. For the first SRS type, the transmit power may be the calculated power of the beam to be transmitted. 626. The WTRU may transmit the SRS using the determined power one or more times. For example, the WTRU may transmit the SRS N1 times and/or on N1 SRS resources. 624. The SRS may be transmitted using the same beam (e.g., each of the N1 times. N1 may be configured. N1 may be 1).

For a second SRS type, the WTRU may determine the SRS power from the set of calculated SRS powers for the beams in the set of beams for which the WTRU may transmit SRS (e.g., one or more best or serving beams and one or more additional or adjacent beams). For example, the WTRU may determine the power (Pwr) to be the maximum of the calculated powers, a maximum power, such as the maximum power for all the beams or the minimum of the maximum powers of each of the beams. 626. The WTRU may determine Pwr based on a configuration (e.g., based on a configured power value). The WTRU may cap the power or scale the power such that the maximum power or the minimum of the maximum powers for the beam is not exceeded. 626.

The WTRU may transmit the one or more (e.g., N1, SRSs) using the determined power. For a first SRS type, the WTRU may use the same beam for one or more (e.g., all the SRS transmissions in the set of SRS transmissions). For a second SRS type, the WTRU may sweep the set of beams.

If the number of requested beams for the SRS transmission exceeds a WTRU capability, the WTRU may repeat one or more beam transmissions, for example so the total number of transmissions may equal the number requested. 628 Alternatively, the WTRU may transmit a SRS up to M times where M is the lesser of the number of transmissions requested and the WTRU capability. Request may be by configuration, trigger, or indication that may be provided via physical or higher layer signaling.

For a first SRS type and a second SRS type, the WTRU may transmit multiple sets of SRS transmissions for a configuration or trigger. For example, the WTRU may be configured or triggered to transmit M sets of N1 SRS transmissions. The N1 transmissions may correspond to a set of beams (e.g., N1 beams). The WTRU may repeat the transmission of SRS on the beams M times. The WTRU may keep the order of the beams the same for each set of N1 SRS transmissions, (e.g., to enable the receiver to combine or correlate the transmissions).

In another example, the power calculated for a SRS on a first beam may be used for a SRS transmission on one or more other beams, such as a group of other beams or all other beams. The first beam may be a reference beam. 634. The beam to use as the reference beam may be configured and/or indicated, for example by an index that may correspond to the beam. The WTRU may determine Pwr for the SRS transmission. For example, the WTRU may determine Pwr for the SRS transmission based on a set of one or more beams based on the power determined or calculated for a beam that may be a reference beam. The WTRU may determine Pwr to be the power determined for the beam that may be the reference beam. 630.

Pwr may be capped, reduced, or scaled to avoid exceeding a maximum power such as a maximum power on a beam (e.g., any beam) that may use Pwr for a SRS transmission. The WTRU may transmit a SRS on a beam or using SRS resources, using power Pwr, after an adjustment to not exceed the maximum power.

The WTRU may determine a power for a SRS transmission based on a reference power, reference beam, or reference beam power (e.g., determined reference beam power) based on any one or a combination of: an SRS type; a reference beam configuration (or indication); and a configuration (or indication) to use reference beam power.

In an example, a WTRU may receive an indication to transmit a set of SRS transmissions that may correspond to a set of beams. The WTRU may receive an indication of an SRS type that may correspond to transmitting a SRS using the power of a reference beam. The WTRU may determine the power for the reference beam and transmit the SRS on one or more beams and/or using one or more SRS resources using the power determined for the reference beam. Request and trigger may be used interchangeably herein. Configuration and trigger may be substituted for each other and still be consistent with the example described herein.

A power control input may be a measurement or a parameter or a combination of a measurement and a parameter. A power control input may be beam-specific or beam common. A power control input may be used by the WTRU to determine or calculate the transmit power of a signal or channel such as a SRS transmission on at least one beam. A power control input may be any one or a combination of pathloss (PL); antenna gain adjustment; TPC (e.g., TPC accumulation); PL compensation factor (e.g., alpha); a target SNR; a maximum power (e.g., Pmax); a resource allocation; an adjusted PL (e.g., alpha×PL); and a configured constant or value.

A WTRU may use a set of power control inputs when determining (e.g., calculating) the transmit power for a SRS transmission. A subset of the power control inputs may be beam-specific. The power control inputs that are not beam specific may be beam common. The terms determine and calculate are used interchangeably herein.

When determining the power for a SRS transmission of a first type, a first subset of the set of the power control inputs (e.g., used in the determination) may be beam-specific.

When determining the power for a SRS transmission of a second type, a second subset of the power control inputs (e.g., used in the determination) may be beam-specific.

The second subset may be smaller than the first subset. The second subset may be a subset of the first subset. The second subset may be the empty set (e.g., the second subset may not include any power control inputs). The first subset may have at least one element. In an example, the first subset may include PL and/or a PL compensation factor. The second subset may not include PL and/or the PL compensation factor.

The first SRS type may correspond to transmission of SRS using one beam. The second type may correspond to transmission of SRS on a set of beams. For a power control input that may be beam-specific in the first subset of power control inputs and not beam specific in the second subset of power control inputs, the WTRU may determine the value for the power control input for the second SRS type from among or based on the beam-specific values that may be used for the first SRS type.

For example, PL may be beam-specific when determining the power for SRS for a first SRS type (e.g., single beam transmission). For a second SRS type (e.g., multi-beam transmission), a common value for the PL may be used. PL is used herein as a non-limiting example of a power control input that may be beam-specific for a first SRS type and beam common for a second SRS type. Any other set or subset of power control inputs may be used and still be consistent with the examples described herein.

For the second SRS type, SRS may be transmitted on a set of beams. The power for the set of beams may be determined using a common PL value. The common PL value may be determined based on the set of PL values corresponding to the set of beams on which SRS may be or is to be transmitted. For example, the common PL value may be one of the PL values such as the largest of the set of PL values for the beams in the set of beams. The common PL value may be a function of the largest PL value. The PL compensation factor to use with (e.g., multiply by) the common PL value may be a configured common compensation factor or one of the beam-specific PL compensation factors such as the compensation factor for the beam with the largest PL.

The PL for use in a power control calculation for an UL beam may be based on a measurement, for example a measurement of a SS-block, CSI-RS, or other DL signal. The DL beam to use for the PL for an UL beam may be based on configuration, beam-pair linkage, whether or not beam correspondence applies, among others.

In another example, the power for a set of beams (e.g., for the second SRS type) may be determined using a common adjusted PL value, e.g., a common value for alpha×PL. The common adjusted PL value may be determined based on the set of adjusted PL values corresponding to the set of beams. For example, the common adjusted PL value may be one of the adjusted PL values such as the largest of the set of adjusted PL values. The common adjusted PL value may be a function of the largest adjusted PL value.

Figure 7:
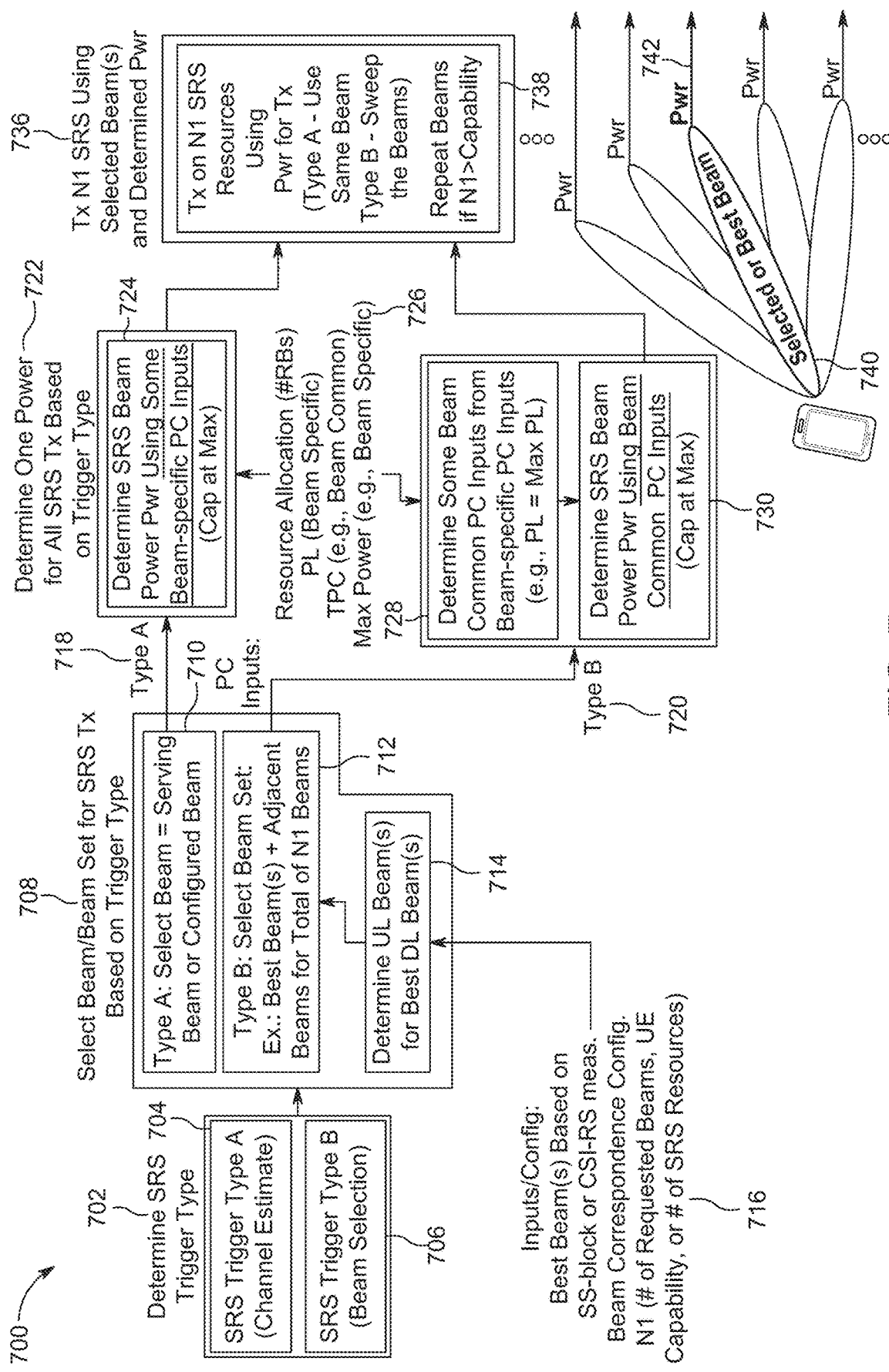
FIG. 7 shows a diagram for performing SRS transmissions based on SRS trigger type according to another example.

FIG. 7 shows a diagram 700 for performing SRS transmissions based on SRS trigger type according to another example. As shown in FIG. 7, a WTRU may receive a configuration or trigger to perform one or more SRS transmissions. The WTRU may determine the type of SRS transmission according to one or more of the examples described herein. 702.

The WTRU may select a beam or beam set for SRS transmission based on the SRS type (e.g., SRS trigger type). 708. The WTRU may select the beam or beam set according to one or more of the examples described herein. The SRS type may be a first type (e.g., Type A) 704 or a second type (e.g., Type B) 706. Type A may be for channel estimation. Type B may be for beam selection. Based on the trigger type, a beam or beam set for transmitting SRS is selected. 708. For the trigger type A, a selected beam may be serving beam or configured beam. 710. For the trigger type A, examples of a selected beam set are best beams and adjacent beams for total N1 beams. 712. N1 is the number of requested beams, WTRU capacity, or the number of SRS resources. 716. For the trigger type B, UL beams for best DL beams are determined or configured, 714, based on SS-block, CSI-RS measurement, or a beam correspondence configuration. 716.

The WTRU may determine (e.g., calculate) a power for transmission of the SRS for the selected one or more beams. 718, 720. The power may be determined based on SRS type. 722. The power may be determined based on or using one or more power control (PC) inputs. 724. One or more of the PC inputs may be beam-specific. For example, PL and/or PL compensation (e.g., alpha) may be beam-specific. 726. TPC accumulation may be beam-specific. 726.

For a first SRS type, the WTRU may determine transmission power based on the PC inputs where some of the PC inputs may be beam-specific. 724. For a second SRS type, the WTRU may determine transmission power based on PC inputs that are beam common. 728. The WTRU may use or may only use beam common PC input values in the determination of SRS power for the second SRS type. 730. The WTRU may determine one power (Pwr) 742 that may be used for transmission of SRS on all the beams in the selected beam set. 740.

For one or more PC inputs that may be beam-specific (e.g., PL, alpha, TPC accumulation) 726, for Type A or single beam transmission, the WTRU may determine a beam common value and use the beam common value in the transmission power determination for multi-beam or Type B SRS transmission. 728.

For a first SRS Type, the WTRU may transmit the SRS using the determined power one or more times. For example, the WTRU may transmit the SRS N1 times and/or on N1 SRS resources. 736. The SRS may be transmitted using the same beam (e.g., each of the N1 times). N1 may be configured. For example, N1 may be 1.

The WTRU may transmit the one or more (e.g., N1) SRSs using the determined power. For a first SRS type, the WTRU may use the same beam for one or more SRS transmissions in the set of SRS transmissions. 738. For a second SRS type, the WTRU may sweep the set of beams. 738. The WTRU may use the same power (e.g., Pwr) for each transmission.

If the number of requested beams for the SRS transmission exceeds a WTRU capability, the WTRU may repeat one or more beam transmissions, for example so the total number of transmissions may equal the number requested. 738. Alternatively, the WTRU may transmit SRS up to M times where M is the lesser of the number of transmissions requested and the WTRU capability.

A power may be or may correspond to an effective isotropic radiated power (EIRP). A maximum power may be or may correspond to a maximum EIRP. EIRP may be substituted for power and still be consistent with the examples described herein. In an example, a WTRU may be configured to employ a common set of parameters and/or input settings for multiple power control processes, and may be separately configured for its process specific settings. During a configuration process, a WTRU may be configured using one or a combination of the following.

In a first step of configuration, a WTRU may be configured with all the parameters and settings required for power setting of the reference transmission. In a second step of configuration, the WTRU may determine the linkage of the two or more power control processes by a bit map indicating whether a parameter or an input is common and may be used across different power control processes.

In an example, a bit map may be used to indicate if a power control process should share a same parameter or input as the reference power control process, where for instance, 1 may indicate sharing the same value (common settings), and 0 may indicate an independent value from the reference process (process specific settings). In a third step of configuration, a WTRU may be configured with its process specific settings that are identified by the received bit map.

For a given component carrier, a WTRU may be configured to link operation of SRS power control to the PUSCH power control. In an example, a WTRU may first be configured with all the parameters and settings required for power setting of the PUSCH transmission. Then, a bit map may be used to indicate if SRS power control should adopt the same set of values for its reference power, PL, PL compensation factor, TPC command and bandwidth parameter as its PUSCH transmission.

Several bit maps may be present to demonstrate the linkage of power control parameters and inputs across multiple power control processes. Table 2 below demonstrates an exemplary case of linkage of parameters between the reference PUSCH transmission and different types of SRS transmissions.

TABLE 2

| Parameters | SRS (CSI-RS) | SRS (Beam management) |
|---|---|---|
| Reference power level, e.g., $P_0$ | 1 | 1 |
| PL compensation factor, $\alpha$ | 1 | 1 |
| PL or an index of DL reference used for PL estimation | 1 | 1 |
| TPC command | 1 | 0 |
| Bandwidth parameter (M) | 1 | 0 |

In certain transmission scenarios, the TPC command may not exist, i.e., $f_c(i)=0$ when there is not a relevant corresponding PUSCH transmission. For SRS power setting, the TPC command $f_c(i)$ may be acted upon differently based on the purpose of the SRS transmission (i.e., Type A or Type B).

In an example, if SRS is used for CSI measurements (Type A), the accumulative TPC command $f_c(i)$ may be used to track PL variation. However, if the SRS transmission is intended for beam selection (Type B), the TPC command may be assumed as $f_c(i)=0$.

In another example, both the accumulative and absolute TPC commands may be used for Type A SRS transmission for CSI measurement. However, for Type B SRS transmission, only an absolute TPC command may be used where the range of TPC command may include 0.

A WTRU may be configured for Type B SRS transmission where each beam may be configured with a different absolute TPC command. Waveform and power headroom (PH) are discussed herein. A WTRU may be configured with more than one waveform that the WTRU may use for transmission. For example a WTRU may be configured with at least a first waveform (e.g., waveform type) and a second waveform. A waveform or waveform type (e.g., waveform class) may, for example, be OFDM, CP-OFDM, DFT-S-OFDM or a variant of OFDM, CP-OFDM, DFT-S-OFDM such as a variant using unique word (UW).

A WTRU may transmit a power headroom report (PHR) in a transmission using a first waveform or a second waveform. The WTRU may include a first set of PHR contents for the waveform used for the transmission in the PHR. The WTRU may include in the PHR, a second set of PHR contents for a waveform not used for the transmission. The second set of PHR contents may be smaller (e.g., may have fewer elements) than the first set of PHR contents.

A set of PHR contents, for example, for a waveform may include at least one of a PH value, a maximum power value that may have been used to determine the PH, an indication as to whether the PH value is real or virtual, and a power backoff value. The maximum power value may be determined for the TTI, time, or time unit of the transmission of the PHR. For example, when the PHR is transmitted in a TTI or time unit such as a slot or mini-slot, the maximum power value may be determined (e.g., by the WTRU) for the TTI or time unit and may take into account one or more transmissions (e.g., by the WTRU) that are at least partially transmitted during the TTI or time unit.

A PH value may be indicated as real when the value is determined based on a real transmission, for example when it is determined using scheduling information for an actual transmission. A PH value may be indicated as virtual when the value is determined based on a reference format or using reference information such as scheduling information. A reference format may include, identify, or imply reference scheduling parameters.

In an example, a WTRU may transmit a PHR in a transmission using a first waveform. The WTRU may transmit the PHR in a time unit such as a TTI, a slot, or a mini-slot. The WTRU may determine a maximum power value Pmax1 for the time unit for the first waveform. The WTRU may determine a maximum power value Pmax2 for the time unit for the second waveform. The value of Pmax2 may be determined assuming the second waveform is used for the transmission instead of the first waveform. Scheduling information for transmission using the first waveform may be considered when determining Pmax1 and/or Pmax2. Alternatively, the value of Pmax2 may be a predefined, configured or otherwise known value such as the power of the WTRU power class.

The WTRU may determine a PH for the first waveform, PH1, which may be determined using Pmax1. PH1 may be determined using scheduling parameters received for the transmission using the first waveform. The WTRU may determine a power P1 for the first waveform where P1 may be determined using scheduling parameters received for the transmission using the first waveform. The WTRU may determine PH1 from P1 and Pmax1. The WTRU may include at least one of PH1 and Pmax1 in the PHR. PH1 may be indicated as real in the PHR.

The WTRU may determine a PH for the second waveform, PH2. PH2 may be determined using Pmax2. PH2 may be determined using scheduling parameters received for the transmission using the first waveform. The WTRU may determine a power P2 for the second waveform where P2 may be determined using scheduling parameters received for the transmission using the first waveform. Alternatively, PH2 may be determined using a reference format or reference scheduling parameters. The WTRU may include at least one of PH2 and Pmax2 in the PHR. Alternatively, the WTRU may not determine PH2.

In an example, the WTRU may include at least PH1, Pmax1, PH2 and Pmax2 in the PHR. In another example, the WTRU may include one but not both of PH2 and Pmax2 in the PHR. The gNB and/or TRP may be able to determine PH2 or Pmax2 from the transmitted PHR contents.

Power sharing methods for asynchronous and mixed numerology transmissions are discussed herein. In particular, power control regions and minimum guaranteed transmit power are discussed.

Figure 8:
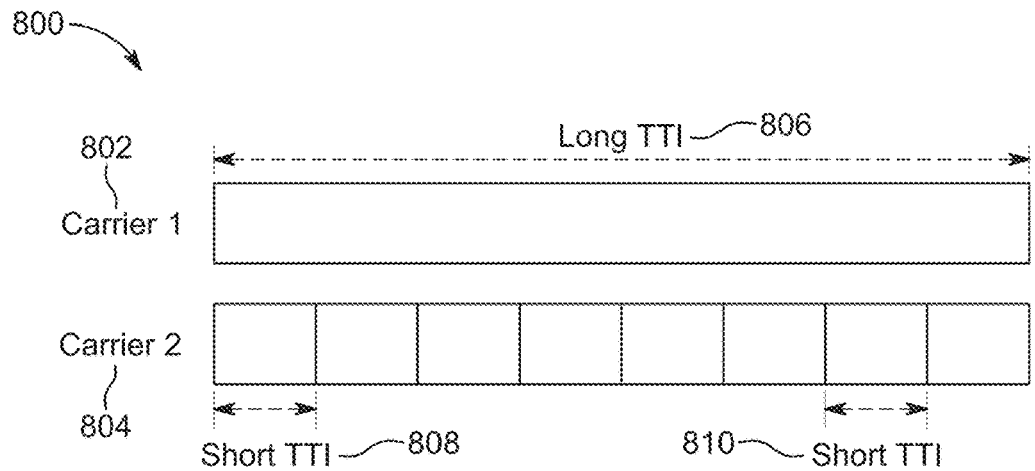
FIG. 8 shows a synchronized transmission from the WTRU with different numerologies.

An example for power sharing in NR with mixed numerology is disclosed. It is assumed that both cases of {<6, <6} GHz and {<6, >24} GHz are addressed. FIG. 8 shows a synchronized transmission 800 from the WTRU using different numerologies. The asynchronous scenario where the boundaries of the symbols on the two carriers may not be aligned is also addressed. The first diagram 802 shows carrier 1 having a long TTI 806, while the second diagram 804 shows carrier 2 having short TTIs 808, 810.

Minimum guaranteed transmit power is discussed herein. In LTE Release 12, power sharing for dual connectivity is discussed with two types of power control modes (mode 1 and mode 2). In both modes, the WTRU is configured with a minimum guaranteed power (MGP) for each cell group (CG). In power control mode 1, the WTRU allocates up to the minimum guaranteed power to each CG and any remaining power is shared across Master CG and Secondary CG on a per transmission basis according to a priority order based on Uplink Control Information (UCI) type. In power control mode 2, the WTRU reserves the MGP for each cell group (CG) and any remaining power is first made available to the cell group (CG) that starts the earliest in time.

For NR with mixed numerology, it is assumed that the different numerologies are transmitted at different frequencies. This implies that the antenna gains may be different even with the same physical transmit and receive antenna(s)/beam(s). Also, with the possibility of beam based transmission, the beam-pairs used in the transmission may change even for a specific numerology. In the case that the same beams are used for both carriers, the beam gains may change across frequencies. As such, the power control modes may take into consideration the relative gains of the beams during power sharing.

To accommodate this, the WTRU may reserve a minimum guaranteed transmit power (MGTP) that takes into account the absolute or relative gains of the antenna(s)/beam(s) used for the different numerologies. This may allow for a more fair sharing of the actual transmit power between the different numerologies, especially in the case where the gains of the transmit/receive beams may vary widely.

Alternatively, the WTRU may reserve a minimum transmit power based on the smallest gain of the antenna(s)/beam(s) used for the different numerologies. This may simplify the procedure but result in more variation in the transmit power between the numerologies.

In another example, the transmission for each beam-pair and numerology may be assigned a power control process. In this case, each power control process may statically, semi-statically or dynamically assign a minimum guaranteed power (MGP) to transmission parameters like the numerology, the beam-pair link and the traffic type (e.g., ultra-reliable data vs eMBB data).

Power control regions for the numerology with longer duration are discussed herein. The minimum time granularity of uplink power control is one subframe. As such, in typical power sharing, there may be no change to the power sharing allocation for the duration of the subframe. This limits the possibility of changing the power allocated to the longer duration signal if for some reason more power becomes available during the transmission.

To mitigate this, a subframe may be sub-divided into power control regions to allow for a change in the power allocation mid-subframe. Typically, the numerology with longer duration may be allowed to change its power level within a sub-frame (or slot). In one example, the data/PUCCH data may be coded across power control regions. In another example, the data/PUCCH information may be limited to coding within a power control region (e.g., by ensuring that coding block groups (CBGs) may not span the power control regions.

Channel estimation for each power control region may be independently performed which implies that reference signals (DMRS, CSI-RS, etc.) may not span power control regions and each power control region shall contain at least one DMRS to enable accurate channel estimation and decoding. In the case that a power control region does not contain a DMRS, the WTRU may indicate the change in power scaling to enable the receiver (the gNB) estimate the change in the channel estimate.

Figure 9:
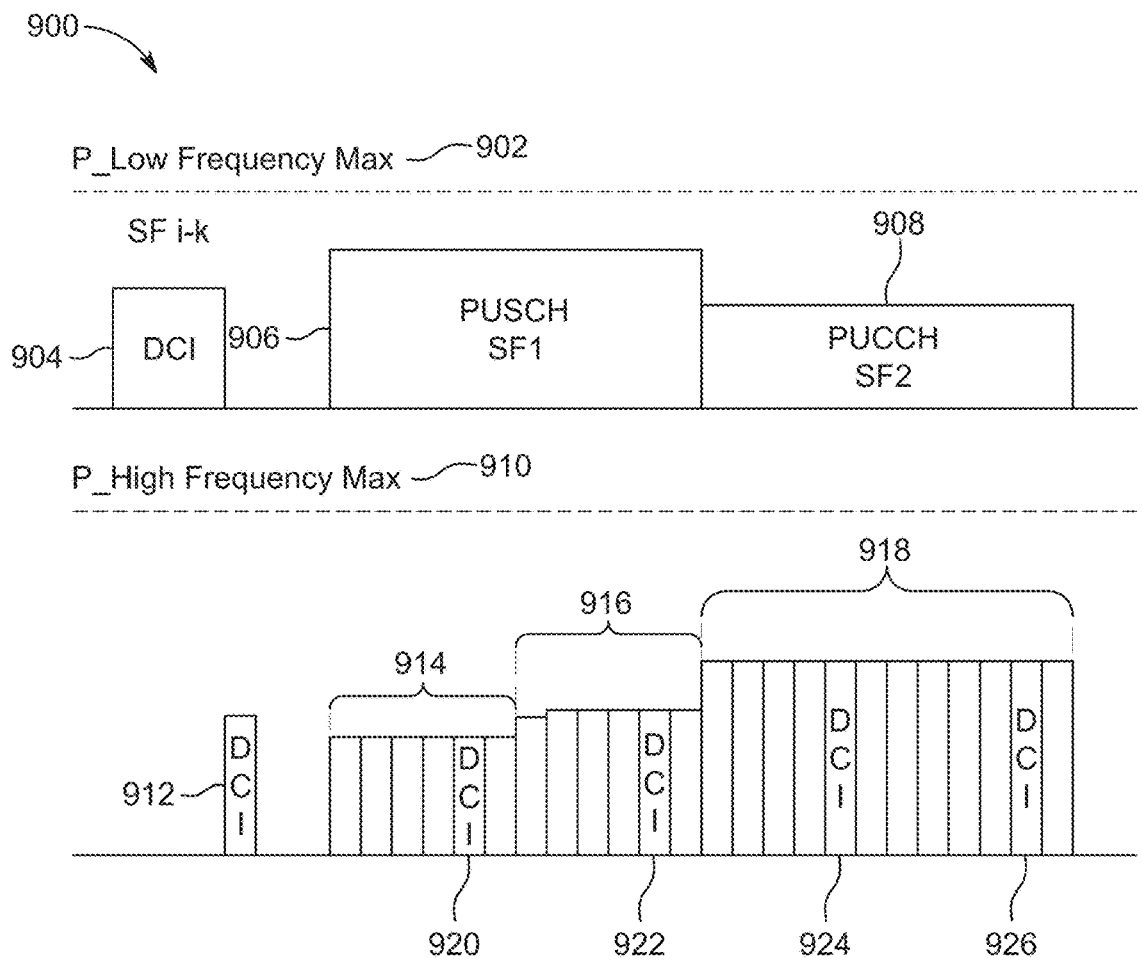
FIG. 9 shows a transmission with fixed power over a subframe.
Figure 10:
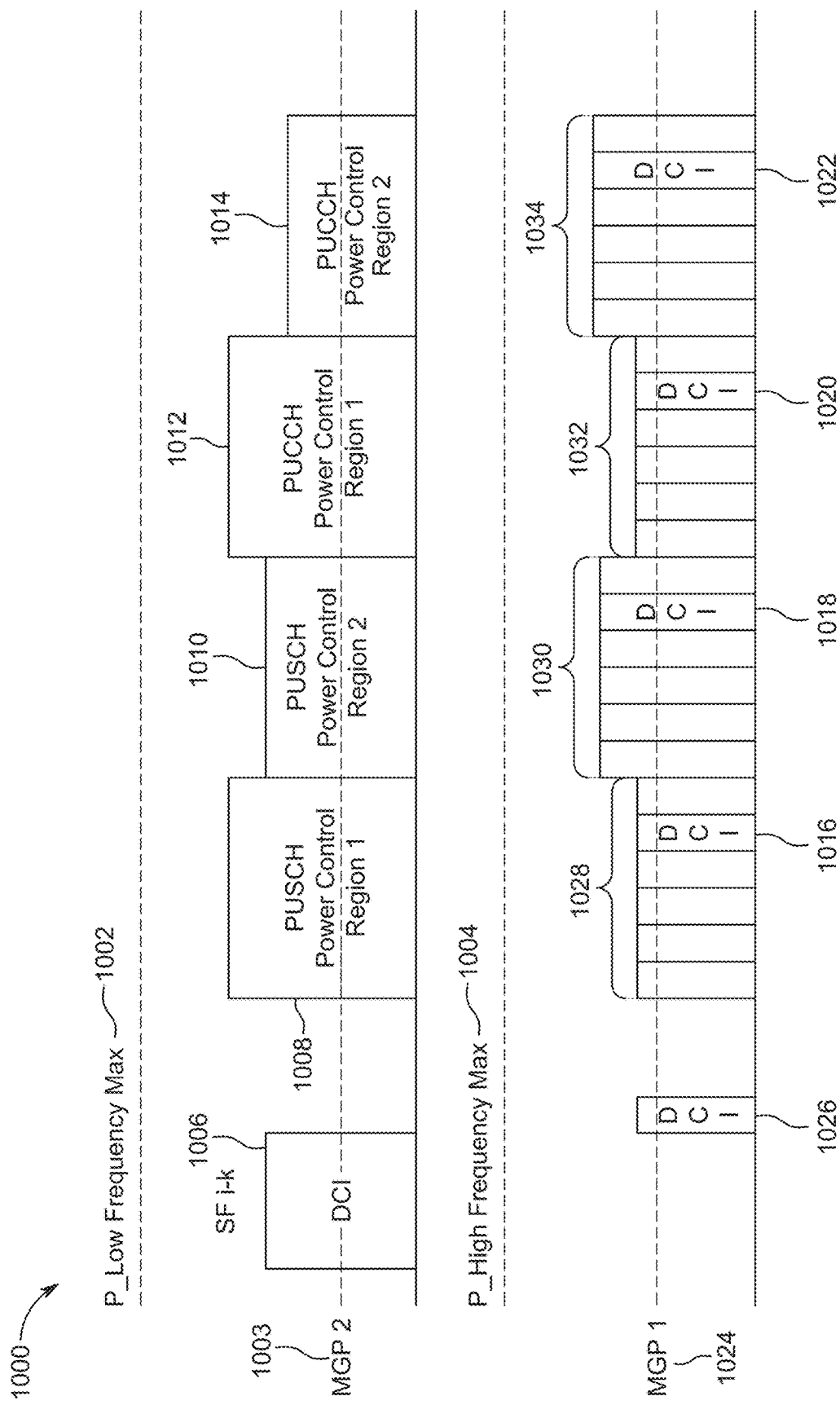
FIG. 10 shows a transmission with power control regions over a subframe.

Power control regions may be set statically, semi-statically or dynamically signaled. FIG. 9 shows a transmission with fixed power over a subframe. Power levels of DCI 904, PUSCH subframe 1 (SF1) 906, and PUCCH subframe 2 (SF2) 908, which may be transmitted over carrier 1, are lower than P_Low Frequency Max 902, which is fixed. Likewise, power levels of power control regions 912, 914, 916, and 918 in FIG. 9, which may be transmitted over carrier 2, are also lower than the fixed P_High Frequency Max 910. FIG. 10 shows a transmission with power control regions over a subframe. In FIG. 10, power levels of channels 1006, 1008, 1010, 1012, and 1014 are lower than the fixed P_Low Frequency Max 1002. Also, power level of power control regions 1026, 1028, 1030, 1032, and 1034 are lower than the fixed P_High Frequency Max 1004. In FIG. 9 and FIG. 10, power control regions are fixed, but may be set up statically, semi-statically or dynamically. Also, the MGPs (1003, 1024 in FIG. 10) are fixed, but may be varied and signaled statically, semi-statically or dynamically.

In the static and semi-static scenario, the boundaries between the power control regions may be fixed and the information on the specific power sharing to be performed may be based on DCI sent by the gNB to the WTRU as fixed intervals. For example, DCIs in FIG. 9 (920, 922, and 924) and FIG. 10 (1016, 1018, and 1020) are transmitted at fixed intervals. The actual regions may be determined by the specific numerology being transmitted. As such, multiple configurations may need to be sent. In one example, a high frequency DCI may be sent at subframe N=4 and be applicable to a low frequency power control region that starts at a time corresponding to a high frequency subframe N=6.

In the dynamic scenario, the power control regions may be adjusted dynamically by the gNB in the DCI. This may allow for multiple power control regions within a slot/subframe based on the change in numerology at the two carriers. It is noted that the boundary of the power control region may be at a DCI+x symbols after the DCI is sent. The value of the x may depend on the WTRU capability with x smaller for higher capability WTRUs.

Also, each power control boundary may be subject to the same or different minimum guaranteed powers (MGPs). The following procedure may be followed. First, a WTRU receives a low frequency DCI (corresponding to longer duration transmission) at subframe i-k 1006. The low frequency transmission may have a fixed minimum guaranteed power/minimum guaranteed transmit power (MGP/MGTP) 1003, based on the fact that it is a cell based transmission. Next, the WTRU receives a high frequency DCI (corresponding to the shorter duration transmission) 1026. The high frequency transmission may have a MGP/MGTP (or a set of MGPs/MGTPs) 1024 due to the possibility of different transmit power gains due to the beam based transmission. The WTRU then sets the power for power control region 1 (1008) for the longer duration transmission with transmit power based on the two received DCIs (1006, 1026). Next, the WTRU sets power for the shorter duration transmission based on the possible beam(s) scheduled. The WTRU then receives high frequency DCI at subframe 5 (1016). Next, the WTRU sets power high frequency subframe 7 and power control region 2 (1010) for the longer duration transmission.

Dynamic demodulation reference signal (DM-RS or DMRS) pattern is discussed herein. One or more time regions may be used within a PUSCH transmission, wherein a transmission power may be determined per time region. A presence of DM-RS for each time region may be determined based on the transmission power determined for the time region. For example, a demodulation reference signal (DM-RS or DMRS) may be transmitted in a first time region and a DM-RS may be transmitted in a second time region if the transmission power for the second time region is different from the first time region. If the transmission power for the second time region is the same as the first time region, no DM-RS may be transmitted in the second time region. One or more of following may apply.

First, the presence or transmission of DM-RS for a time region may be determined based on the transmission power difference ($\Delta P$) from the previous time region. For example, if the transmission power difference $\Delta P$ between a previous time region (Pa) and a current time region (Pb) is less than a predefined threshold ($\Delta P=|Pa-Pb|<$a threshold), no additional DM-RS is transmitted in the current time region; if $\Delta P=|Pa-Pb|>$a threshold, additional DM-RS is transmitted in the current time region.

A DM-RS transmission or presence of a first time region may not be determined based on the transmission power of the first time region. The DM-RS transmitted in the first time region may be referred to as front-loaded DM-RS. A DM-RS transmission or presence of a subsequent time regions may be determined based on the transmission power of the time region; the DM-RS transmitted in a time region due to the transmission power difference may be referred to as an additional DM-RS. The additional DM-RS may be located at the first OFDM symbol or the first DFT-s-OFDM symbol within the time region.

Second, the density of DM-RS may be determined based on the level of transmission power difference. For example, a first DM-RS density may be used for a time region if the transmission power difference is larger than a first threshold and a second DM-RS density may be used for a time if the transmission power difference is larger than a second threshold.

One or more threshold may be configured via a higher layer signaling or indicated in the associated DCI for an uplink grant. One or more DM-RS densities may be configured via a higher layer signaling or indicated in the associated DCI for an uplink grant.

Third, the number of time regions may be configured or indicated. The time location and length of one or more time regions within a PUSCH transmission may be determined based on the number of time regions configured or indicated.

Fourth, the number of time regions may be implicitly determined based on the TTI length of another carrier which may be used simultaneously. For example, a first TTI length may be used for a first carrier and a second TTI length may be used for a second carrier. A PUSCH with a longer TTI length may have one or more time regions and the time region length may be the same as a shorter TTI length.

Fifth, the transmission power of a time region (e.g., except for the first time region) for a PUSCH in a carrier may be determined based on whether another PUSCH transmission occurred/scheduled in another carrier at the same time. For example, a lower transmission power may be used for a time region if another PUSCH transmission occurred/scheduled in another carrier at the same time and a higher transmission power may be used for a time region if no another PUSCH transmission occurred/scheduled in another carrier.

In another example, one or more DM-RS patterns may be used and a DM-RS pattern may be determined based on whether the transmission power change occurred during a PUSCH transmission or not. For example, a first DM-RS pattern may be used if the transmission power is unchanged during a PUSCH transmission and a second DM-RS pattern may be used if the transmission power is changed during a PUSCH transmission. One or more of following may apply.

The first DM-RS pattern may have a lower DM-RS density over the second DM-RS pattern. One or more DM-RS patterns may be used and the DM-RS pattern may be different based on the number of transmission power changed during a PUSCH transmission. For example, a second DM-RS pattern may be used if the transmission power is changed once during a PUSCH transmission and a third DM-RS pattern may be used if the transmission is changed twice during a PUSCH transmission.

In another example, a WTRU may be configured, indicated, or scheduled to transmit one or more uplink signals over one or more carriers, wherein the TTI length of the uplink signals which may be transmitted over one or more carriers may be different. When a WTRU may be scheduled to transmit two or more uplink signals with a different TTI length, a WTRU may determine the transmission of uplink signals based on one or more of following.

A WTRU may drop an uplink transmission in a carrier if the WTRU may transmit an uplink signal in another carrier with a transmission power higher than a predefined threshold. If a WTRU transmits an uplink signal in a carrier with a transmission power higher than a predefined threshold, the WTRU may not monitor NR-PDCCH for an uplink transmission in another carrier during the uplink transmission.

Power sharing with guaranteed DMRS power is discussed herein. A WTRU may be configured to transmit simultaneous uplink signals with different transmission time intervals. The simultaneous uplink transmissions may occur on different carriers, beams, or connection points, which may be called as dual connectivity. For example, two uplink transmissions may be based on a same numerology, but may have different transmission time intervals, e.g., Transmission Time Interval (TTI) versus shortened TTI (sTTI). Or, the two uplink transmissions may have different numerologies, resulting in different transmission time intervals, (e.g., uplink waveforms with different subcarrier spacing).

Based on certain performance targets, a WTRU may allocate more power to one uplink transmission over another transmission. Some examples of the performance targets are QoS, delay tolerance, reliability requirement, error rate and target SNR. For example, a WTRU may prioritize PUCCH over PUSCH in power allocation. Or, a WTRU may prioritize PUSCH with L1/L2 control information over PUSCH data. Alternatively, a WTRU may consider more power for URLLC (Ultra-Reliable Low Latency Communication) transmission than other use cases. For simultaneous transmissions of uplink signals with similar priorities, (e.g. PUSCH and PUSCH), a WTRU may use open-loop parameters to set the priority for power allocation.

Each uplink transmission may comprise a main payload and a set of demodulation reference signals (DMRS) with a guaranteed power per transmission interval. A WTRU may first determine the priority of the each uplink transmission for power allocation, and then the WTRU may set a fixed guaranteed power for the DMRS of the each uplink. The fixed guaranteed power setting for the DMRS may be configured as a fixed value, a semi-static ratio or a dynamic ratio. Alternatively, the power may be assumed the same as the power of the first transmitted DMRS. The criteria for determination of the fixed value may be the same as stated above, QoS, delay tolerance, reliability requirement, error rate and target SNR.

A WTRU may update power settings for all simultaneous transmissions at the rate of the shorter transmission interval. For example, in a system with 2 simultaneous PUSCH transmissions, namely PUSCH_1 and PUSCH_2, with TPC commands $TPC_1$ and $TPC_2$. During the corresponding transmission intervals of $TTI_1$ and $TTI_2$, where $TTI_2 < TTI_1$, a WTRU may update the power settings with every decoding of the $TPC_2$. As such, a power adjustment for each link may start as $$P_{PUSCH\_1} = P_{PUSCH\_data1}(TPC_1) + P_{PUSCH\_DMRS1}$$
$$(TPC_1)$$

$$P_{PUSCH\_2} = P_{PUSCH\_data2}(TPC_2) + P_{PUSCH\_DMRS2}$$
$$(TPC_2)$$

$$P_{PUSCH\_1} + P_{PUSCH\_2} \le P_{c\_max}$$

where $P_{c\_max}$ is the maximum configured WTRU power that is less than the $P_{T\_max}$, the maximum terminal output power.

If PUSCH_2 has a higher priority than PUSCH_1, a power level may be adjusted in favor of PUSCH_2. If by application of $TPC_2$, the PUSCH_2 power $P_{PUSCH\_data\_2}$ ($TPC_2$) increases such that $P_{PUSCH\_1} + P_{PUSCH\_2} > P_{c\_max}$, then $P_{PUSCH\_data\_1}(TPC_1)$ may be reduced by an offset $\lambda$ to satisfy $P_{PUSCH\_1} + P_{PUSCH\_2} \le P_{c\_max}$.

Figure 11:
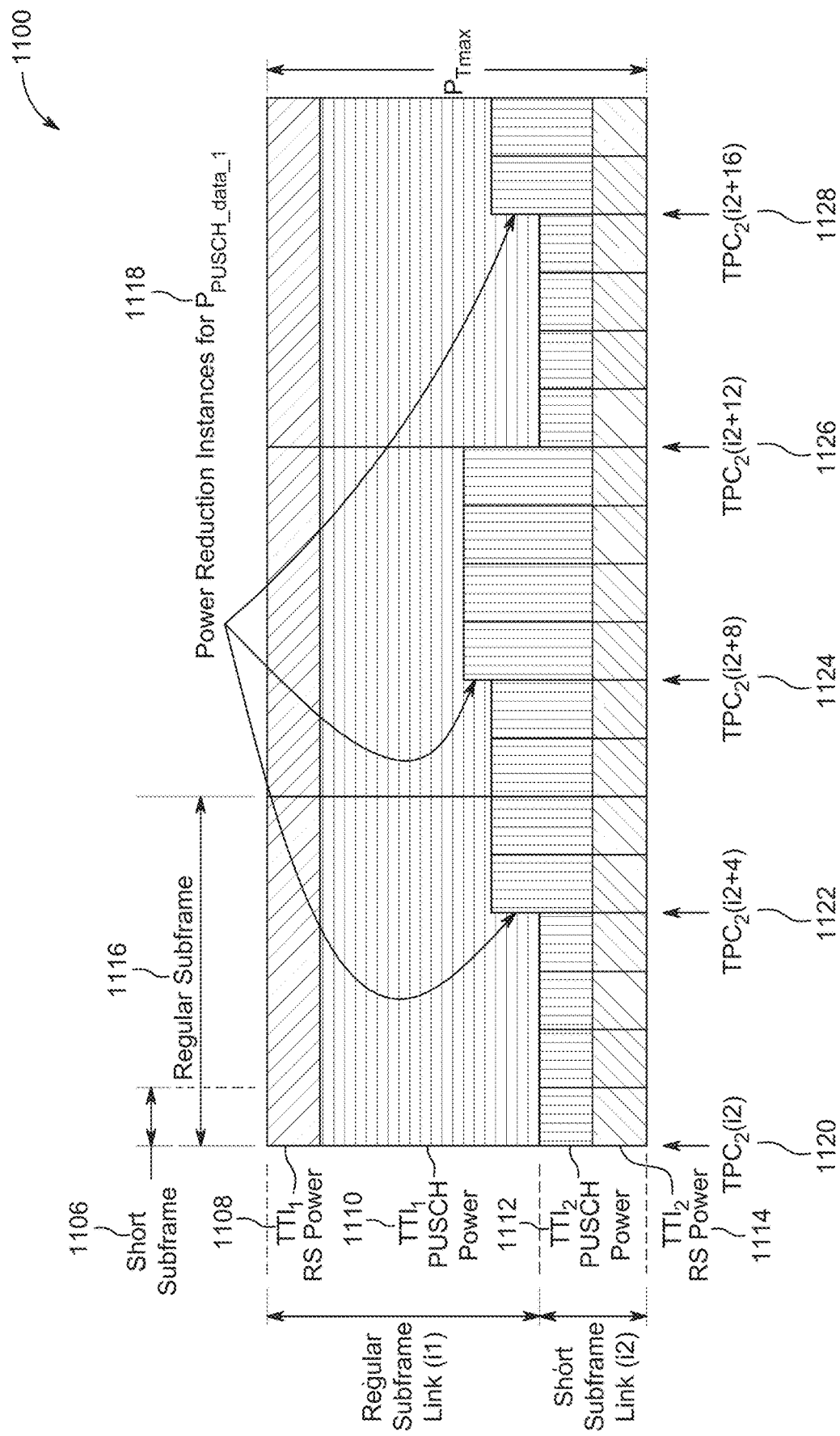
FIG. 11 shows an example of power sharing with guaranteed demodulation reference signal (DMRS) power.

FIG. 11 shows an example 1100 of power sharing with guaranteed DMRS power for the case of two simultaneous PUSCH transmissions with transmission intervals of $TTI_1$ and $TTI_2$. $TTI_1$ RS Power 1108 and $TTI_1$ PUSCH Power 1110 for TTI are transmitted by regular subframes 1116, while $TTI_2$ RS Power 1114 and $TTI_2$ PUSCH Power 1112 for $TTI_2$ are transmitted by short subframes 1106.

For the both PUSCH transmissions, the DMRS powers, during the regular subframes 1116 and the short subframes 1106, are maintained at fixed levels 1108, 1114. But, with every update of $TPC_2$ 1122, 1124, 1126, 1128, $P_{PUSCH\_2}$ powers are updated or increased 1118, and $P_{PUSCH\_1} + P_{PUSCH\_2} \le P_{c\_max}$ is checked to verify if $P_{PUSCH\_data\_1}$ ($TPC_1$) needs to be offset or reduced by $\lambda$.

Since the DMRS power is maintained at a fixed level 1108, 1114, a gNB may proceed to perform channel estimation required for demodulation and detection. A gNB may scale the data part of the uplink transmission for proper demodulation of the data payload.

If the simultaneous uplink transmissions are intended for a single gNB, e.g., carrier aggregation cases, the gNB may know the simultaneous scheduling, and thus the gNB knows MCS parameters of the multiple asynchronous PUSCH transmissions, as well as other related power setting parameters, if a scaling of the data payload is necessary. If simultaneous uplink transmissions are not intended for a single gNB, the gNB may determine the scaling of the data payload.

Power sharing for transmission overlap is discussed herein. A WTRU may transmit a set of 2 or more uplink signals or channels having different time slots or different frequency characteristics like TTIs, start times, or numerologies. The transmissions may overlap (e.g., at least partially) in time.

A WTRU may start with no joint consideration for power levels and may apply a power sharing mechanism such as a MGP or a power split (e.g., a basic power split such as a 50% or other ratio power split) when (e.g., only when) a total power (e.g., for a set of overlapping or simultaneous transmissions) exceeds or will exceed a maximum allowed power. A total power may be a sum of the powers. When a power split is used, a transmission may use a fraction or a percentage of the maximum power. The allocation of power to the channels and signals of the transmission may be based on a priority (e.g., relative priority) of the channels and signals.

A power split is based on the minimum guaranteed power (MGP) or a basic power split may be applied on all uplink channels and signals, or only on a predefined subset thereof. In an example, the power split may be applied only on the PUSCH data payload, and not on its related uplink DMRS.

If uplink transmissions based the configured fixed power split ratio result in excessive failed transmissions on either link, the split ratio may be re-adjusted. A gNB may reconfigure a WTRU with an updated value for the basic power split ratio. The basic power split ratio may be reconfigured dynamically through a L1/L2 or semi-statically through higher layer signaling. Alternatively, instead of a complete reconfiguration, a WTRU may adjust the power split ratio based on an offset value to tweak up/down the ratio. The offset value may be indicated by L1/L2, or semi-statically through higher layer signaling.

A set of power split ratios may be defined and indexed, such that a WTRU is directed to the desired power setting by decoding the received index. The new power split ratio may also be indicated implicitly using a sequence parameter (e.g., a DMRS pattern).

A WTRU may adjust the power split ratio autonomously based on a set of certain conditions. A WTRU may adjust the power split ratio to roll over some power from one link to another based on priority, and channel type. Assuming similar level of priority and channel type, a WTRU may shift some power based on the relative number of acknowledgment/non-acknowledgment (ACK/NACK) received on each uplink transmission.

A WTRU may adjust the power split ratio based on a single or a subset of downlink signal power measurements. The decision may be based on L1/L3 filtered measurements, or a combination thereof.

A WTRU may be configured with a set of $\{P_{max}, P_{min}\}$ values to assure that the WTRU autonomous update of power split ratio does not go beyond a certain range.

The WTRU may maintain the power sharing until at least one of the transmissions ends and/or until overlapping (or simultaneous) transmission (e.g., without a power sharing mechanism) does not or will not result in a maximum allowed power being exceeded.

A WTRU may provide power sharing control information (PSCI). The PSCI may be provided via a signal or channel, for example via one or more characteristics (e.g., transmission characteristics) of a signal, via a control channel (e.g., one or more information bits included in or carried by the channel), or via control information that may be transmitted with, included with, or piggybacked on a data channel. A transmission characteristic may be or may include at least one of a sequence, a pattern, a power, a time location, a frequency location, a scrambling code, an orthogonal cover code, among others.

PSCI may indicate or may be used to indicate at least one of: whether or that a power sharing mechanism is applied; what power sharing mechanism is applied; when (e.g., for which symbols, slots, power control regions, etc.) power sharing is applied; a start time, an end time, and/or a duration of the power sharing (e.g., in symbols, slots, power control regions, etc.); what is the scale factor or power reduction applied (e.g., as a result of the power sharing or power scaling); and one or more parameters associated with the power sharing or power reduction.

A WTRU may transmit the indicator signal or channel during (e.g., at the end of) or after one or more of the transmissions to which the indicator applies. For example a WTRU may determine a transmit power for a first transmission (e.g., UL transmission) without considering a power sharing mechanism (e.g., a MGP or a power split) with a second transmission (e.g., UL transmission). The WTRU may begin transmitting the first UL transmission using the determined transmit power.

The WTRU may determine that a second transmission may overlap (e.g., at least partially) in time with the first transmission. The WTRU may determine a power sharing mechanism for the first and second transmissions. The WTRU may use the power sharing mechanism during (e.g., only during) at least one of the following times: the overlap time of the first and second transmissions; the duration of the shorter transmission; a period of time prior to the overlap that may begin on a time boundary such as a symbol or slot boundary (e.g., the closest previous time boundary prior to the overlap) and may end at the start of the overlap. A time boundary may be a boundary of a power control region.

A WTRU may use for a first transmission (e.g., one that may end after a second transmission) a power sharing mechanism that may result in a reduced power (for at least the first transmission) during an overlap with the second transmission. The WTRU may continue to use (for the first transmission) a reduced power determined for the overlap after the overlap ends, for example until a time boundary (e.g., the closest next time boundary after the overlap) or until the end of the first transmission.

When using a power sharing mechanism prior to an overlap, a power reduction may be determined based on the upcoming overlap. When using a power sharing mechanism after an overlap, the power reduction may be determined based on the preceding overlap. A WTRU may provide an indicator signal or channel during or after the first and/or second transmission. The WTRU may provide (e.g., only provide) an indicator signal or channel for a transmission affected by a power sharing (e.g., with a reduced power).

Figure 12:
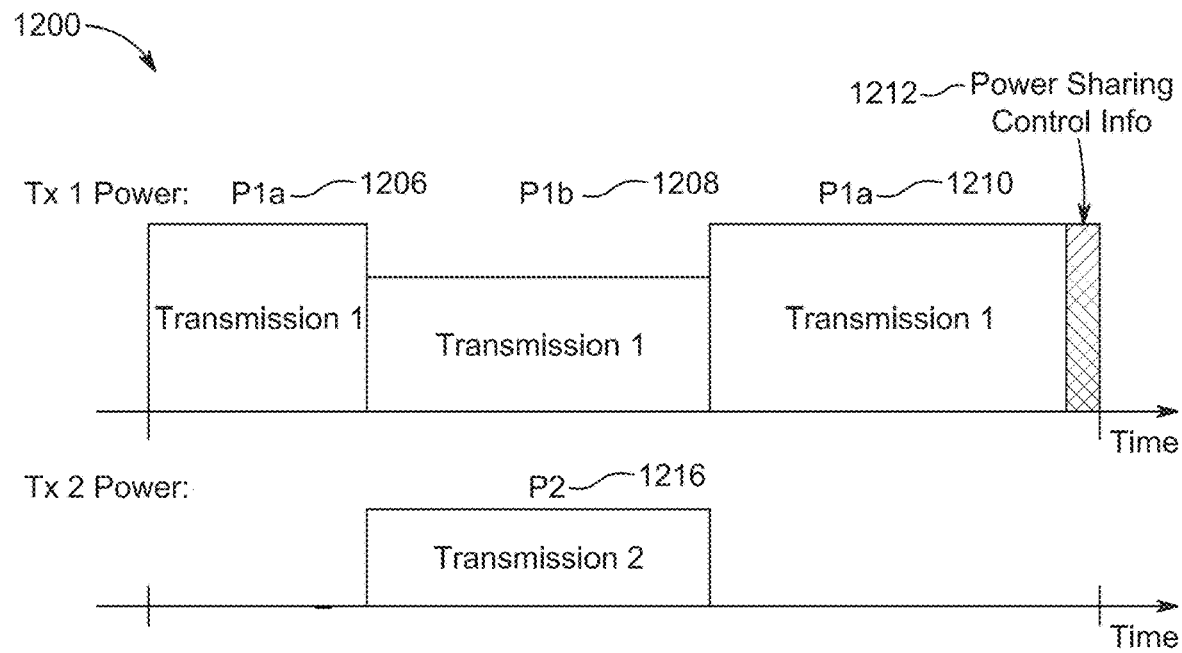
FIG. 12 shows an example of power sharing for overlapping transmissions.

FIG. 12 shows an example of power sharing for overlapping transmissions. In the example, the power determination (e.g., by a WTRU) for transmission 1 (Tx 1) does not consider a second transmission (Tx 2) until it may transmit (e.g., prepares to transmit) the second transmission. If the maximum power may be exceeded when the transmissions overlap, the WTRU may apply a power sharing mechanism for the overlap. The power of one or both transmissions may be scaled or reduced. In an example, each transmission may be allocated a percentage of the maximum power such as 50%. The power of a transmission may be reduced such that it does not exceed the allocated percentage.

PSCI may be provided (e.g., by the WTRU) during or at the end of a transmission, for example a transmission for which power is at least adjusted (e.g., due to a maximum power condition or power sharing) for at least part of the transmission. PSCI may not be provided for a transmission for which the power of the transmission is unchanged or changed the same way for the entire transmission.

PSCI may not be provided for a transmission for which the power of the transmission is not adjusted (e.g., due to a maximum power condition or power sharing) for the duration of the transmission. PSCI may be provided at least sometimes for a transmission for example based on a configuration that indicates to provide PSCI.

In the example 1200 shown in FIG. 12, PSCI 1212 may be provided for transmission 1. PSCI 1212 may indicate that power sharing or a power reduction occurred during the transmission. PSCI may not be provided for transmission 2, since P2 1216 is unchanged for the duration of the transmission. P2 1216 may be the power of transmission 2 with or without reduction due to power sharing, depending on whether transmission 2 power without reduction is above or below transmission 2's share of the maximum power.

PSCI 1212 may indicate whether power sharing is applied during the transmission. PSCI 1212 may indicate which channel or channels of a transmission may be impacted by power sharing, for example, when a transmission may include multiple channels (e.g., a control channel and a data channel such as PUCCH and PUSCH). A channel may be impacted by power sharing when the power of the channel is reduced or scaled due to power sharing.

Power reduction or scaling may be according to a set of reduction levels (e.g., scaling factors) that may be configured or otherwise known. For example, the set may be 0, 1, 2, and 3 dB. When applying power sharing, the power (e.g., of a channel or transmission) may be reduced (e.g., by a WTRU) by one of the reduction factors, for example the lowest one that enables the WTRU to not exceed its power share for a transmission. PSCI may indicate at least one power reduction factor that is applied to a transmission. PSCI may indicate a power reduction level for one or more channels of a transmission.

Figure 13:
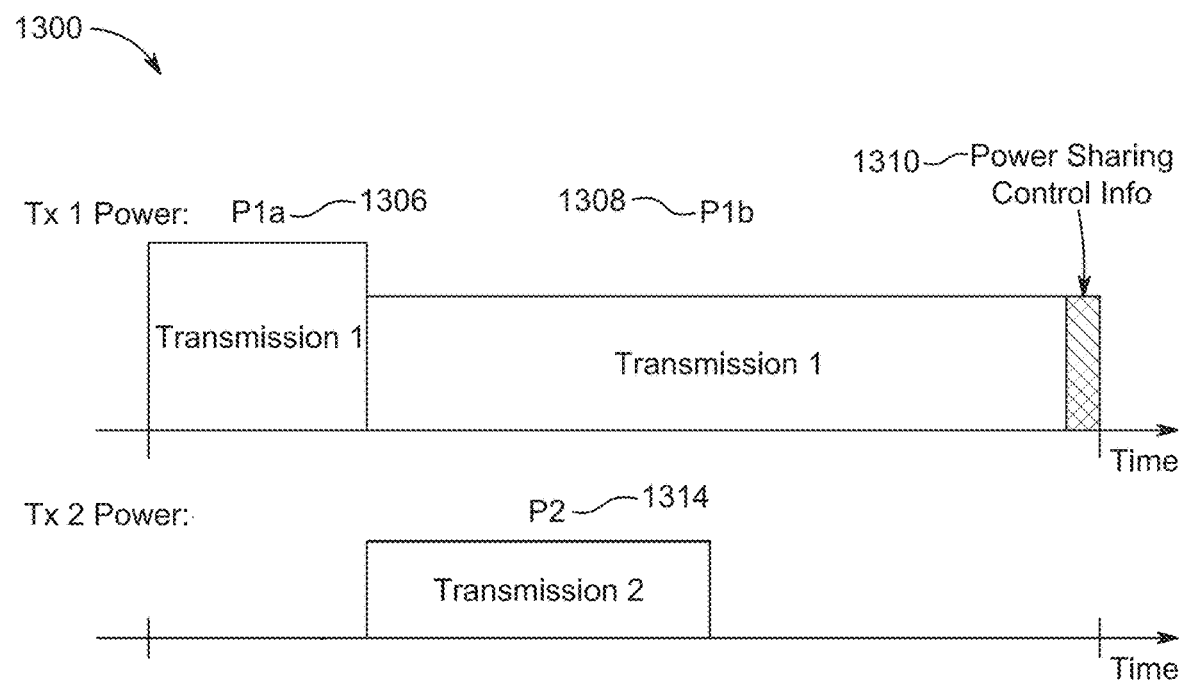
FIG. 13 provides another example of power sharing for overlapping transmissions where the determined power for the overlap continues until the end of the transmission.

FIG. 13 provides another example 1200 of power sharing for overlapping transmissions where the determined power for the overlap continues until the end of the transmission. PSCI 1310 may indicate that power sharing or a power reduction occurred during the transmission. PSCI 1310 may not be provided for transmission 2, since P2 1314 is unchanged for the duration of the transmission.

Figure 14:
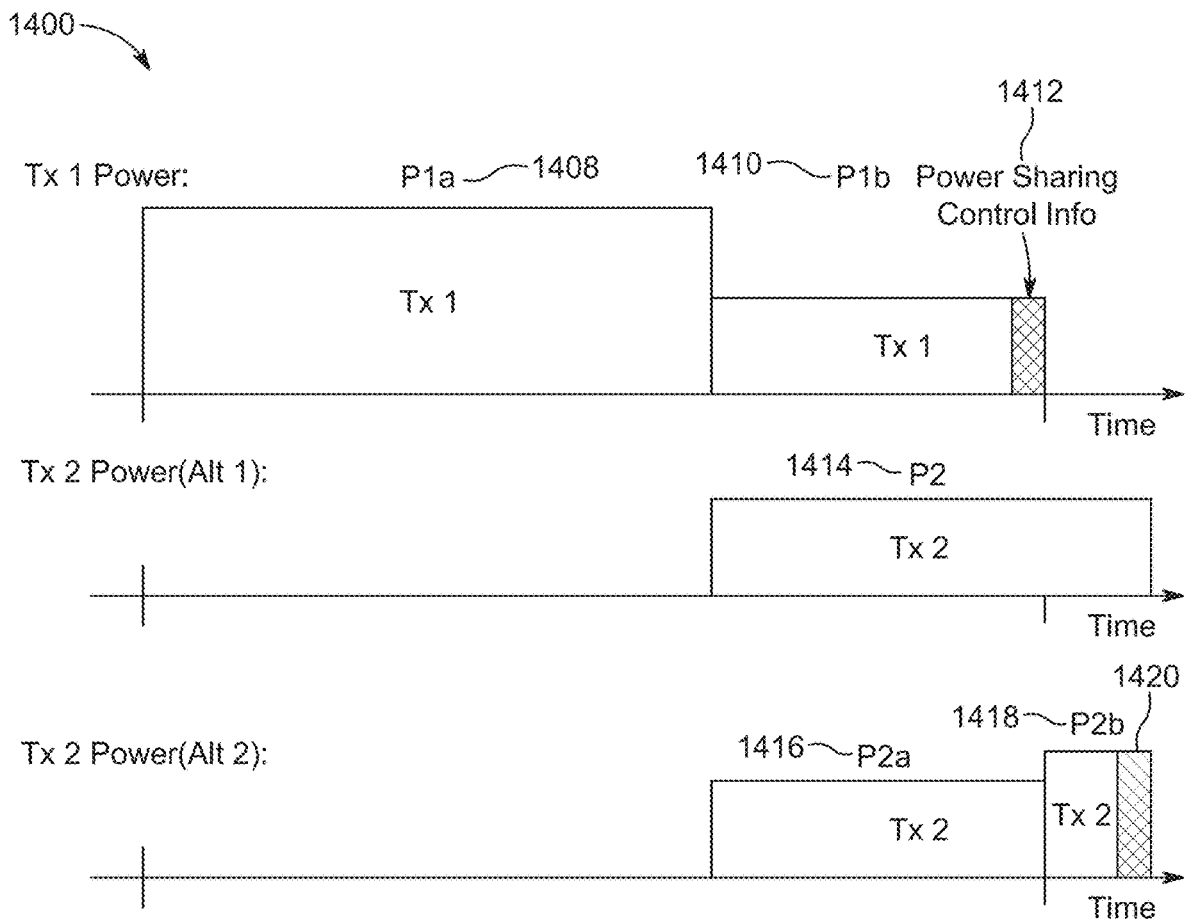
FIG. 14 provides another example of power sharing for overlapping transmissions.

FIG. 14 provides another example 1400 of power sharing for overlapping transmissions. In alternative 1, the determined power (1414) for the overlap for Tx 2 continues until the end of the transmission. In alternative 2, Tx 2 (1416) overlapping with Tx1 (1410) is reduced and then the regular (e.g., unshared, or unreduced) power (1418) is resumed when Tx 1 ends. PSCI 1420 may be transmitted for one or both of Tx 1 and Tx2.

PSCI may be transmitted when (e.g., only when) the power changes during transmission, for example by more than a threshold that may be configured. PSCI may be conveyed or carried by a reference signal such as DM-RS.

In a system with a beamforming capability, beam shaping may be used to reduce the actual generated power by the power amplifier. As a result, a WTRU may be able to reduce power consumption and the freed up power may be used for power sharing in case of simultaneous multi-beam uplink transmission.

In an uplink transmission with fixed TX and RX antenna configurations, a power control setting for PUSCH or a similar channel may be governed by $$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$

where the estimated $P_{PUSCH,c}(i)$ is the power transmitted by the antenna system of the WTRU. The antenna system is pointed to a specific direction according to the system's beam characteristics.

If a WTRU has some beamforming capability, the estimated $P_{PUSCH,c}(i)$ may be considered as an equivalent isotropic radiated power (EIRP) amount for the given transmission direction defined by the current TX antenna configuration with $$P_{PUSCH,c}(i) = EIRP = P_{PUSCH,c\_actual}(i) - L + \eta D$$

where $P_{PUSCH,c\_actual}(i)$, L, η and D represent the actual power amplifier output, antenna cable/assembly loss, electrical efficiency of the antenna and the antenna directivity, respectively. Without loss of generality, assuming a cable/assembly loss of L=0 and an efficiency of η=1, $$P_{PUSCH,c}(i) = P_{PUSCH,c\_actual}(i) + D.$$

Therefore, if a WTRU has some beamforming capability, the actual power amplifier output may be traded off against the directivity of a beam.

A WTRU antenna system may contain a single or a 2-dimensional array of $N_{T\_panel}$ panels where each panel itself may have a 2-dimensional structure, composed of $N_{T\_row} \times N_{T\_column}$ antenna elements that are spanned over two dimensions in the space. It is noted that any or all of the following antenna elements may be used for a transmission.

A WTRU may be configured or activated to adjust its beam properties before or during a transmission. For example, beam properties may be any one or a combination of the following: directivity, beam width, side lobes, polarization, and the like. Upon de-activation, the WTRU may return to a default setting of the antenna system.

A WTRU may be configured with more than one value where each value may be based on a set of beam property hypothesis. For example, each value may be based on a specific beam directivity value. Alternatively, each value may be based on a subset of ports, panels or even antenna elements.

The directivity of the antenna may be readjusted for a given direction (θ, φ) in the spherical coordinates based on the required $P_{PUSCH,c}(i)$ and the available (feasible) $P_{PUSCH,c\_actual}(i)$. To achieve the target $P_{PUSCH,c}(i)$ and $P_{PUSCH,c\_actual}(i)$ values, the required antenna directivity may be readjusted by re-computing the beamforming coefficient for a given direction (θ,φ).

To realize the target $P_{PUSCH,c}(i)$ and $P_{PUSCH,c\_actual}(i)$ target values, the number of employed antenna elements or panels may be managed accordingly. As such, the number of antenna used from the set of $N_{T\_panel} \times N_{T\_row} \times N_{T\_column}$ antennas may be readjusted to increase or decrease the directivity.

With multiple simultaneous uplink transmissions, where a power sharing mechanism is required, a WTRU may be configured to allocate and balance the radiating resources, i.e., antenna elements or panels, according to the requirements of associated links to each beam. Therefore, the number of the employed antennas or panels for each link may be traded off against each other based on certain criteria, such as the channel priority, expected performance and channel type, a minimum guaranteed number of antennas may be considered for each uplink transmission. Furthermore, a subset of the antennas may not be assigned to either link, and they may be reserved for optimization of the directivity of a link based on a certain requirement, such as priority, service type, urgency, timing, etc.

The power control setting mechanism may include an additional input indicating the directivity of the antenna. For example, the exemplary PUSCH power setting may be modified as $$P_{PUSCH,c}(i) = \min \begin{cases} P_{Ref,c}(i), \\ 10\log_{10}(M_{PUSCH,c}(i)) + P_{O\_PUSCH,c}(j) + \\ \alpha_c(j) \cdot PL_c + \Delta_{TF,c}(i) - \Delta_{D,c}(i) + f_c(i) \end{cases}$$

where $P_{Ref,c}(i)$ may represent a max reference power such as $P_{CMAX,c}(i)$. Alternatively, $P_{Ref,c}(i)$ represents a power level that includes the directivity of the employed WTRU antenna system. For example, $P_{Ref,c}(i)$ may be expressed as the EIRP of the antenna system or it may be based on an average or a max directivity value, and the like. There may be several $P_{Ref,c}(i)$ values defined, where a specific subset of $N_{T\_row} \times N_{T\_column}$ antennas from the set of panels assumed for each. The term $\Delta_{D,c}(i)$ represents a correction factor with respect to the default directivity or a reference directivity value considered for the antenna system. For example this reference may be the Peak EIRP of the antenna system, where the $P_{CMAX,c}(i)$, may include the peak EIRP antenna gain.

A WTRU may be configured to activate or de-activate employment of the $\Delta_{D,c}(i)$ term for power setting. A WTRU may be configured with a definite set, or a range of values for $\Delta_{D,c}(i)$. A WTRU may first use a value from the set to meet the required $P_{Ref,c}(i)$ value, and then re-compute the coefficients, or allocate the required size of the antenna resources, accordingly. Alternatively, the power control setting mechanism may be expressed as:

$$P_{PUSCH,c}(i) = \min\begin{Bmatrix} P_{CMAX,c}(i) + D_{Ref}(i), \\ 10\log_{10}(M_{PUSCH,c}(i)) + P_{O\_PUSCH,c}(j) + \\ \alpha_c(j) \cdot PL_c + \Delta_{TF,c}(i) - \Delta_{D,c}(i) + f_c(i) \end{Bmatrix}$$

where $D_{Ref}(i)$ represents a reference directivity value for a given WTRU antenna system, for example maximum directivity, an average directivity, cumulative distribution function (CDF)-based average etc., there may be several $D_{Ref}(i)$ defined where for each, a specific subset of coefficients or $N_{T\_row} \times N_{T\_column}$ antennas are assumed.

Alternatively, the power control setting mechanism may be expressed as $$P_{PUSCH,c}(i) = \min\begin{Bmatrix} P_{CMAX,c}(i) + D_{Ref}(i) - \Delta_{D,max,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}.$$

In this example, the variation of the antenna gain may be included in the upper limit. In the expression $P_{CMAX,c}(i) + D_{Ref}(i) - \Delta_{D,max,c}(i)$, the term $D_{Ref}(i) - \Delta_{D,max,c}(i)$ may represent variation of the antenna system directivity, and it may be considered as an implementation margin. Thus, $\Delta_{D,max,c}$ (may be considered as the maximum deviation of the antenna gain from the peak value $D_{Ref}(i)$ that may indicate a worst case of the antenna gain over the sphere coordinates relevant for the gNB open loop power control assumptions.

If the lowest value of the $P_{cmax}$, c is defined to include the max deviation then the power control equation may be expressed as:

$$P_{CMAX\_Lc}(i) < P_{CMAX,c}(i) <= P_{CMAX\_Hc}(i)$$

Due to potential large variation of the beam directivity over the sphere $\Delta_{D,max,c}$, there may be a significant discrepancy between the actual directivity of the antenna system, and the gNB assumption for the worst case beam directivity, in order to accelerate the convergence of the gNB scheduler to the actual or real beam directivity value, a PHR transmission may be required as soon as the first PUSCH transmission or to be included in the last RACH message.

In another example, a PHR may be accompanied with a SR (scheduling request) to assist gNB scheduler for a fast convergence on the actual beam directivity value. The actual beam directivity value may determine real $P_{CMAX\_Lc}$ for the WTRU.

The WTRU may signal the $\Delta_{D,c}(i)$ set of values as a RF capability along with its power class or separately. If the WTRU is configured with a set of values of $\Delta_{D,c}(i)$, the WTRU may feedback in a PHR report the used value in order to make the gNB aware of its antenna system directivity gain capability headroom along with available power. Based on the directivity feedback value, the gNB may decide to change the WTRU transmission pattern (to a narrower beam for instance due to UL network interference or to a wider beam due to WTRU mobility). This directivity change may be signaled via DCI, MAC CE or even semi-statically through RRC signaling.

In another example, a Beam Headroom Feedback (BHF) with a very short format (e.g., 2 or 3 bits) may be defined to map a relative level below the Peak EIRP (or simply below Power Class). The short PHR information (BHF) may be embedded in the CSI feedback that may be periodic or aperiodic depending on the granularity of the gNB configured feedback.

For example, a periodic CSI will contain the normal channel quality feedback, and the BHF, while aperiodic CSI feedback will be allowed to be transmitted when the beam gain changes dramatically and a periodic CSI or a MAC CE (normal PHR) would be too slow for fast scheduler convergence.

Tenth, the receiver may also be equipped with multiple antenna elements or multiple antenna panels which may allow it to perform receive side beamforming using all or a subset of its antenna elements. The power control mechanism may be further adjusted by taking into account the additional antenna directivity provided by the receive side beamforming. The power control mechanism may include a correction factor $\Delta_{R,c}(i)$ which is related to the receiver side directivity and it may be fed back from the receiver to the transmitter. The PUSCH power setting may be further modified as $$P_{PUSCH,c}(i) = \min\begin{Bmatrix} P_{Ref,c}(i), \\ 10\log_{10}(M_{PUSCH,c}(i)) + P_{O\_PUSCH,c}(j) + \\ \alpha_c(j) \cdot PL_c + \Delta_{TF,c}(i) - \Delta_{D,c}(i) - \Delta_{R,c}(i) + f_c(i) \end{Bmatrix}.$$

In an alternative example, the following formula may be used:

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) - \Delta_{Dc}(i) + f_c(i) \end{Bmatrix}$$

where $P_{cmax}$ is EIRP based and is relative to the maximum EIRP capability of the WTRU.

A WTRU may be configured to activate or de-activate employment of the $\Delta_{R,c}(i)$ term for power setting. A WTRU may be configured with a definite set, or a range of values for $\Delta_{R,c}(i)$ where each value may correspond to an index. A WTRU may determine the correction value from the set after decoding an index from the received DCI.

In another example, the WTRU may be configured to activate or deactivate the employment of the $\Delta_{D,c}(i)$ through DCI, MAC-CE command or RRC signaling (semi-statically).

When employment of the $\Delta_{D,c}(i)$ is de-activated, this may infer a legacy transmission equivalent to 0 dBi antenna assumption in LTE (meaning $\Delta_{D,c}(i)=0$). This may be equivalent to the maximum TRP (Total Radiated Power)

capability of the WTRU that can be produced with a MPR=0 reference waveform. This may be considered also as a fallback transmission mode when some other beamforming modes failed. For example, when a PRACH transmission is unanswered by a gNB, the WTRU may transition autonomously to the $\Delta_{D,c}(i)=0$ mode. Similar behavior may be used after receiving a certain number of NACK for PUSCH transmissions and being at the maximum power in EIRP terms. The transition to $\Delta_{D,c}(i)=0$ in this case may be controlled by a NACK threshold (based on a certain number of consecutive NACKs) configured by network or autonomously by a WTRU when no network feedback is possible.

Figure 15:
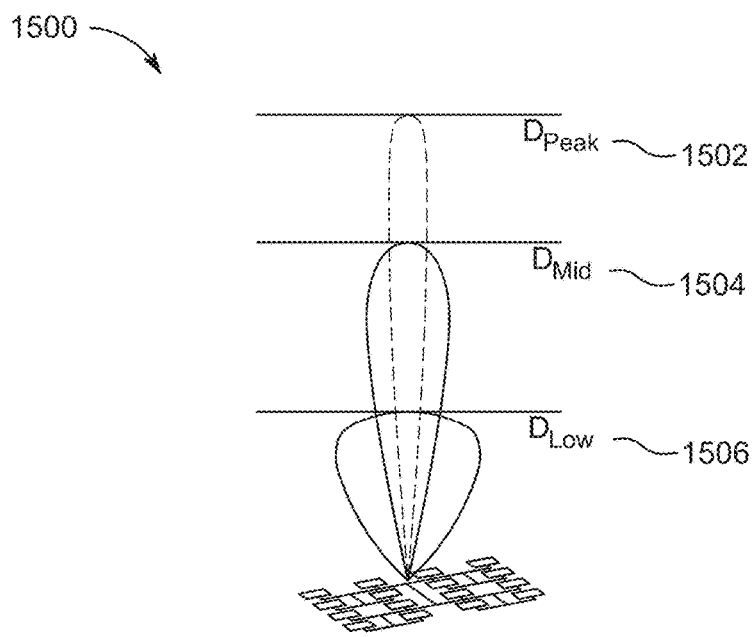
FIG. 15 shows an example of an antenna system with the capability of generating three different beams at a given direction.

A WTRU may indicate its beamforming capability to the gNB. The capability information may contain any one or a combination of the following capability information: beam width, directivity (gain), angular sweeping range, and the like and corresponding multiplicities. FIG. 15 shows an example 1500 of an antenna system with the capability of generating three different beams 1502, 1504, 1506 at a given direction.

The capability information may be in form of a set of parameters identifying each capability separately, or the capability information could be an index referring to a set of predefined values. The capability information may also indicate the default beam setting.

A gNB may activate or deactivate WTRU beamforming capability as a whole, or it may select and indicate to the WTRU a subset of the WTRU's beamforming capabilities as the allowed range of beamforming operation. A gNB may also identify and signal a specific beam configuration as the fallback mode.

A WTRU may determine its beam configuration by receiving and detecting a beam configuration index (BCI). The BCI may be in the form of an index that directs a WTRU to use a preconfigured beam setting configuration. A WTRU may be configured by one or multiple BCI's based on the type of the service, mobility, channel, and the like.

Once a WTRU is configured with a new BCI, the WTRU may automatically send a PHR report at the earliest possible transmission event. Alternatively, since a gNB is aware of BCI definition, the gNB may update the current PHR.

In an example of PUSCH transmission, once a WTRU is configured with a specific BCI, the gNB may apply a correction to the $P_{O\_PUSCH,c}(j)$ value. Alternatively, a WTRU may be configured simultaneously with a BCI and a new $P_{CMAX(k),c}(i)$ value.

A WTRU may receive a beam directivity command (BDC) from the gNB to step up or down over the range of the directivity. In its simplest form, BDC may be in a form of $\{0, +/-1\}$ to move the BDC up and down over the range of the defined directivity.

A WTRU may always start its transmission with a default beam setting. Since a gNB is aware of the previously sent BDC commands and is also aware of the WTRU range of the beamforming capability, the gNB may track the state of the employed beam.

Alternatively, a WTRU may send a directivity headroom report (HHR) to indicate its distance to the peak allowed directivity.

In an example of PUSCH transmission, once a WTRU is directed with a specific BDC command, the gNB may apply a correction to the $P_{O\_PUSCH,c}(j)$ value. Alternatively, while a WTRU may be directed with a BDC command, the WTRU may concurrently get configured with a new $P_{CMAX(k),c}(i)$ value.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for reporting power head room by a wireless transmit receive unit (WTRU), the method comprising:
   receiving first scheduling information that includes parameters for a physical uplink shared channel (PUSCH) transmission using a first waveform type;
   transmitting a power headroom report (PHR) in the PUSCH transmission using the first waveform type, wherein the PHR includes:
   a first power headroom (PH) information associated with the first waveform type, and a second PH information associated with a second waveform type;
   wherein the first PH information includes a PH value and a first maximum transmit power value (Pmax1), and the second PH information includes a second maximum power value (Pmax2), and
   wherein the first waveform type is a different waveform type than the second waveform type;
   wherein the PHR includes an indication that the PH value is a real PH value and is determined based on at least the first scheduling information; and
   wherein Pmax2 is determined with an assumption that the second waveform type is used for the transmission; and
   wherein the first waveform type is orthogonal frequency-division multiplexing (OFDM) waveform type, and the second waveform type is a DFT spread OFDM (DFT-S-OFDM) waveform type.

2. The method of claim 1, wherein the PHR includes an indication that the PH value is based on reference information.

3. The method of claim 1, wherein the first PH information includes less elements than the second PH information.

4. The method of claim 1 further comprising: receiving configuration information related to Pmax1 and Pmax2.

5. The method of claim 1 further comprising: receiving second scheduling information for an uplink transmission in response to the transmitted PHR.

6. A wireless transmit receive unit (WTRU) configured to report power headroom, the WTRU comprising:
   a receiver configured to receive a first scheduling information that includes parameters for a physical uplink shared channel (PUSCH) transmission using a first waveform type;
   a transmitter configured to transmit a power headroom report (PHR) in the PUSCH transmission using the first waveform type, wherein the PHR includes:
   a first power headroom (PH) information associated with the first waveform type, and a second PH information associated with a second waveform type;

wherein the first PH information includes a PH value and a first maximum transmit power value (Pmax1), and the second PH information includes a second maximum power value (Pmax2), and wherein the first waveform type is a different waveform type than the second waveform type;

wherein the PHR includes an indication that the PH value is a real PH value and is determined based on at least the first scheduling information; and wherein Pmax2 is determined with an assumption that the second waveform type is used for the transmission; and wherein the first waveform type is orthogonal frequency-division multiplexing (OFDM) waveform type, and the second waveform type is a DFT spread OFDM (DFT-S-OFDM) waveform type.

7. The WTRU of claim 6, wherein the PHR includes an indication that the PH value is based on reference information.

8. The WTRU of claim 6, wherein the first PH information includes less elements than the second PH information.

9. The WTRU of claim 6, wherein the receiver is further configured to receive configuration information related to Pmax1 and Pmax2.

10. The WTRU of claim 6, wherein the receiver is further configured to receive second scheduling information for an uplink transmission in response to the transmitted PHR.

* * * * *